United States Patent
Scheller et al.

(10) Patent No.: US 11,952,036 B2
(45) Date of Patent: Apr. 9, 2024

(54) STEERING DOLLY

(71) Applicant: Aspen Custom Trailers Inc., Leduc (CA)

(72) Inventors: Patrick Scheller, Leduc (CA); Phil Johnston, Leduc (CA)

(73) Assignee: ASPEN CUSTOM TRAILERS INC., Leduc (CA)

(*) Notice: Subject to any disclaimer, the term of this patent is extended or adjusted under 35 U.S.C. 154(b) by 43 days.

(21) Appl. No.: 17/373,300

(22) Filed: Jul. 12, 2021

(65) Prior Publication Data

US 2022/0048565 A1 Feb. 17, 2022

(30) Foreign Application Priority Data

Aug. 14, 2020 (CA) .................................. 3090090

(51) Int. Cl.
*B62D 13/02* (2006.01)
*B62D 13/00* (2006.01)

(52) U.S. Cl.
CPC ......... *B62D 13/025* (2013.01); *B62D 13/005* (2013.01)

(58) Field of Classification Search
CPC ........ B62D 12/00; B62D 12/02; B62D 13/00; B62D 13/005; B62D 13/02; B62D 13/025; B62D 53/04; B62D 53/06
See application file for complete search history.

(56) References Cited

U.S. PATENT DOCUMENTS

| | | | | |
|---|---|---|---|---|
| 2,793,052 A | * | 5/1957 | Googe | B62D 13/025 280/445 |
| 4,982,976 A | * | 1/1991 | Kramer | B62D 13/04 280/426 |
| 5,201,836 A | * | 4/1993 | DeWitt | B62D 13/025 280/426 |
| 6,604,753 B1 | * | 8/2003 | Boyd | B62D 61/125 280/137.5 |
| 8,333,399 B2 | * | 12/2012 | Brown | B62D 53/0814 280/433 |
| 9,051,007 B2 | * | 6/2015 | Orgeron | B62D 13/00 |
| 9,555,831 B1 | * | 1/2017 | Dahlstrom | B62D 53/06 |
| 10,953,936 B2 | * | 3/2021 | Lutz | B62D 33/08 |

(Continued)

FOREIGN PATENT DOCUMENTS

| | | | | |
|---|---|---|---|---|
| EP | 2457767 A1 | * | 5/2012 | ........... B62D 53/067 |
| EP | 2674349 A1 | * | 12/2013 | ........... B62D 13/025 |

*Primary Examiner* — Tony H Winner
*Assistant Examiner* — Maurice L Williams
(74) *Attorney, Agent, or Firm* — LEWIS ROCA ROTHGERBER CHRISTIE LLP

(57) ABSTRACT

A steering system for steering a heavy haul trailer dolly comprising a turntable mounted on the dolly for connecting to another trailer unit. The dolly comprising a main frame, a wheel group mounted to the main frame, and a pivot frame mounted to the main frame between the turntable and the wheel group. A counter-steering linkage connects the pivot frame and the turntable. Hydraulic cylinders connect the pivot frame and the wheel group. To automatically steer the dolly, the hydraulic cylinders are locked in length. Rotation of the turntable in one direction causes the pivot frame and the wheel group to rotate in the opposite direction. To steer the dolly directly, the hydraulic cylinders are operated to extend and retract, pushing and pulling against the pivot frame and turntable to rotate the wheel group.

9 Claims, 22 Drawing Sheets

(56) References Cited

U.S. PATENT DOCUMENTS

2014/0300082 A1* 10/2014 Szabo .................... B60D 5/00
                                                                                   280/492
2019/0263448 A1* 8/2019 Lukka .................... B62D 13/04

* cited by examiner

STEERING DOLLY

CROSS-REFERENCE TO RELATED APPLICATION(S)

This application claims priority to Canadian Patent Application Number 3,090,090, filed on Aug. 14, 2020, the entire contents of which is incorporated herein by reference.

FIELD OF THE INVENTION

This invention relates to heavy haul trailers. In particular the invention relates to steering dollies and other steering trailer units for heavy haul trailers.

BACKGROUND OF THE INVENTION

As a dolly-equipped trailer turns, means are usually provided for counter-steering the dolly wheels during the turn. One prior art means of doing so is disclosed in U.S. Pat. No. 4,484,758 to Murray et al. Murray et al. discloses a self-steering trailer having an elongated main frame, a rear portion of which is supported by a subframe and a steering doily. The subframe is positioned beneath the rear portion of the main frame A first turntable is mounted on the subframe to connect the rear portion of the main frame to the subframe. A second turntable is mounted on the doily to connect a rear portion of the subframe to the dolly. A steering means is connected between the rear portion of the main frame and the dolly for automatically steering the rear of the trailer around a turn.

The steering means comprises an A-frame having a pair of arms connected to opposite sides of the dolly, and a steering arm fixed to the rear portion of the main frame. The A-frame is pivotally connected to the rear end of the steering arm by a hitch which can be selectively engaged and disengaged.

When the trailer turns, the rear portion of the main frame pivots on the first turntable, and the steering arm swings towards the outside of the turn, deflecting the front end of the A-frame in this direction. This turns the dolly about the axis of the second turntable, steering the rear of the trailer toward the outside of the turn. In other words, when the trailer makes a left turn, the rear end of the main frame pivots in a counterclockwise direction about the axis of the first turntable and the dolly pivots in a clockwise direction about the axis of the second turntable. Similarly, when the trailer makes a right turn, the rear end of the main frame pivots in a clockwise direction and the dolly pivots in a counterclockwise direction.

To steer the rear of the trailer directly the A-frame is disconnected from the steering arm and a manually controlled actuator such as a hydraulic ram is connected between the rear end of the subframe and the steering dolly.

FIGS. 1-3 show another prior art approach to effect such counter-steering. FIG. 1 shows a side view of a dolly 12 attached to another trailer unit 14. A turntable 10 is mounted between the dolly 12 and the other trailer unit 14. Referring to FIGS. 2 and 3, the turntable 10 is attached to a stinger bar 16 that is hinged to a compensator bar 18, which as is known to those skilled in the field, is attached to the turntable at one end, the other end of which slides through a sleeve.

The compensator 18 is mounted on a pivot frame 20 that is in turn attached to the wheel group 22 by a pair of tie rods 24. More particularly, the tie rods 24 are attached to a box frame 26 that supports, for example, pairs of short track axles and wheels. As the trailer turns, the turntable 10 imparts displacement of one end of the compensator bar 18 in the direction of the turn and by the linkage between the compensator bar 18 and the wheel group 22, the wheel group 22 is made to automatically turn in the opposite direction.

When a particularly tight turn must be undertaken or when the dolly must be steered independently of the towing trailer unit, it is necessary to manually disconnect the stinger 16 from the compensator 18, as shown in FIG. 3 and to use hydraulic cylinders 28 to act on the pivot frame 20 so as to impart a turn to the wheel group.

In normal or automatic operation when the stinger 16 and compensator 18 are hinged to one another, the cylinders 28 are set to float so that they retract and extend freely as the pivot frame pivots.

The disconnection of the stinger from the compensator in order to effect a directly controlled turn is an inconvenience to operators of the trailers. It is an object of the present invention to avoid the need to disconnect the stinger from the compensator in order to steer the dolly directly when required.

This and other objects will be better understood by reference to this application as a whole Not ail of the objects are necessarily met by all embodiments of the invention described below or by the invention defined by each of the claims.

SUMMARY OF THE INVENTION

According to the invention, the object is achieved by effectively eliminating the tie rods so that the hydraulic cylinders act as the primary linkage between the pivot frame and the wheel group.

When the trailer is operating in automatic mode, i.e. where direct steering of the dolly is not required, the stroke of the hydraulic cylinders is fixed so that the hydraulic cylinders effectively act as tire rods between the compensator and the wheel group.

When it is desired to steer the doily directly, the hydraulic cylinders are operated in variable stroke mode so as to steer the wheel group using the hydraulic cylinders while effectively pushing against the pivot frame. The hydraulic cylinders are operated to extend and retract, pushing against the pivot frame (and indirectly against the turntable) to rotate the wheel group. As a result, it is no longer necessary to disconnect the stinger from the compensator in order to operate the dolly in direct steering mode.

Accordingly, in one aspect, the invention is a heavy haul trailer dolly having a steering system, the dolly comprising: a main frame, a turntable mounted on the main frame; a wheel group pivotally connected to the main frame; a pivot frame pivotally connected to the main frame located between the turntable and the wheel group; a counter-steering linkage between the turntable and the pivot frame, comprising a stinger bar mounted on the turntable and a compensator bar mounted on the pivot frame, the compensator bar pivotally connected to the stinger bar; and a pair of hydraulic cylinders connecting the pivot frame and the wheel group, each cylinder connected to opposing sides of the pivot frame and corresponding sides of the wheel group, each cylinder being lockable in a fixed length so as to act as a fixed length mechanical linkage between the pivot frame and the wheel group for automatically counter-steering the wheel group, and each cylinder being operable to vary in length a piston associated with the cylinder for directly controlling the steering of the wheel group.

In another aspect, the invention is a method of steering a heavy haul trailer doily, the doily comprising a main frame, a turntable mounted on the main frame, a wheel group pivotally connected to the main frame, a pivot frame pivotally connected to the main frame located between the turntable and the wheel group, a stinger bar mounted on the turntable and pivotally connected to a compensator bar mounted on the pivot frame, and a pair of hydraulic cylinders connecting the pivot frame and the wheel group, the method comprising: operating the dolly in an automatic steering mode by causing the hydraulic cylinders to be locked at a fixed length.

In a further aspect, operating the dolly in an automatic steering mode comprises: rotating the turntable in one direction to actuate a turn such that a rear end of the stinger bar moves a front end of the compensator bar towards the outside of the turn thereby causing the pivot frame to rotate in an opposite direction whereby to cause the hydraulic cylinders to rotate the wheel group in the opposite direction.

In yet a further aspect, the invention is a method of steering a heavy haul trailer dolly, the dolly comprising a main frame, a turntable mounted on the main frame, a wheel group pivotally connected to the main frame, a pivot frame pivotally connected to the main frame located between the turntable and the wheel group, a stinger bar mounted on the turntable and pivotally connected to a compensator bar mounted on the pivot frame, and a pair of hydraulic cylinders connecting the pivot frame and the wheel group, the method comprising: operating the doily in a direct steering mode by operating the cylinders in variable length mode to act on a wheel group to rotate according to extension lengths of pistons associated with the cylinders.

In yet another aspect, the invention is a method of steering a heavy haul trailer dolly, the dolly comprising a main frame, a turntable mounted on the main frame, a wheel group pivotally connected to the main frame, a pivot frame pivotally connected to the main frame located between the turntable and the wheel group, a stinger bar mounted on the turntable and pivotally connected to a compensator bar mounted on the pivot frame, and a pair of hydraulic cylinders connecting the pivot frame and the wheel group, the method comprising: selectively operating the dolly in an automatic steering mode or a direct steering mode; the automatic steering mode comprising locking each of the hydraulic cylinders at a fixed length, the direct steering mode comprising unlocking the hydraulic cylinders from being in a fixed length and operating the cylinders in variable length mode by varying in extension length pistons associated with the cylinders.

In another aspect, the invention is a heavy haul trailer unit having a steering system, the trailer unit comprising: a main frame; a pivot attachment for pivotally connecting the trailer unit to another trailer unit; a wheel group pivotally connected to the main frame; a pivot frame pivotally connected to the main frame; a counter-steering linkage between the pivot attachment and the pivot frame; and a pair of hydraulic cylinders connecting the pivot frame and the wheel group, each cylinder connected to opposing sides of the pivot frame and corresponding opposing sides of the wheel group, each cylinder being selectively lockable in a fixed length so as to act as a fixed length mechanical linkage between the pivot frame and the wheel group for automatically counter-steering the wheel group, and being selectively operable to controllably vary in extended length a piston associated with the cylinder whereby pivoting of the wheel group may be controlled by extended lengths of pairs of pistons respectively associated with the cylinders.

In a more particular aspect, the counter-steering linkage may comprise a stinger bar mounted on the turntable; and a compensator bar mounted on the pivot frame, the compensator bar pivotally connected to the stinger bar. The heavy haul trailer unit may be a dolly. The pivot-attachment may be a turntable.

In yet another aspect, the invention is a steering system for steering a heavy haul trailer dolly, comprising: a turntable; a dolly, the turntable mounted on the dolly, the dolly comprising a main frame, a wheel group pivotally connected to the main frame, a pivot frame pivotally connected to the main frame located between the turntable and the wheel group, a counter-steering linkage between the turntable and the pivot frame, and a pair of hydraulic cylinders connecting the pivot frame and the wheel group, each cylinder connected to opposing sides of the pivot frame and corresponding opposing sides of the wheel group, each cylinder being lockable in a fixed length so as to act as a fixed length mechanical linkage between the pivot frame and the wheel group, and being operable to vary in length a piston associated with the cylinder whereby movement of the wheel group is controlled directly; wherein the turntable connects the dolly to another trailer unit.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which.

DETAILED DESCRIPTION OF AT LEAST ONE MODE FOR CARRYING OUT THE INVENTION IN TERMS OF EXAMPLE(S)

Figure 1:
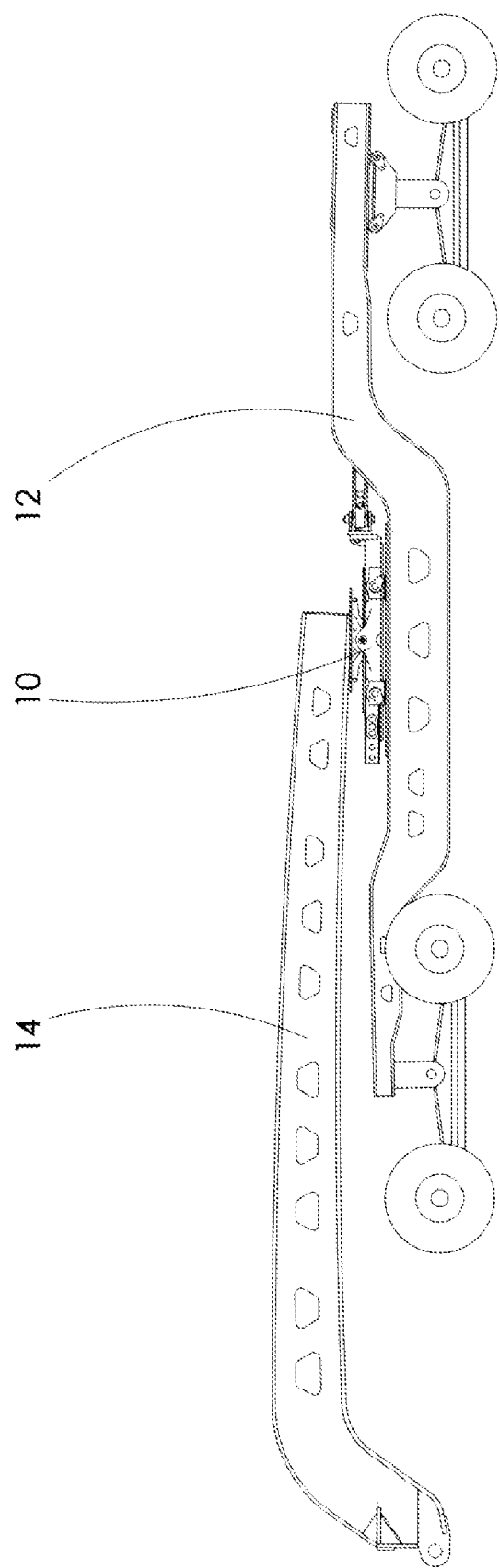
FIG. 1 is a side view of a steering dolly according to the prior art, attached to another trailer unit by a turntable.

FIGS. 1-3 show a typical heavy haul trailer steering dolly 12 according to the prior art. FIG. 1 is a side view of the dolly 12 connected to another trailer unit 14 by a turntable 10.

Figure 2A:
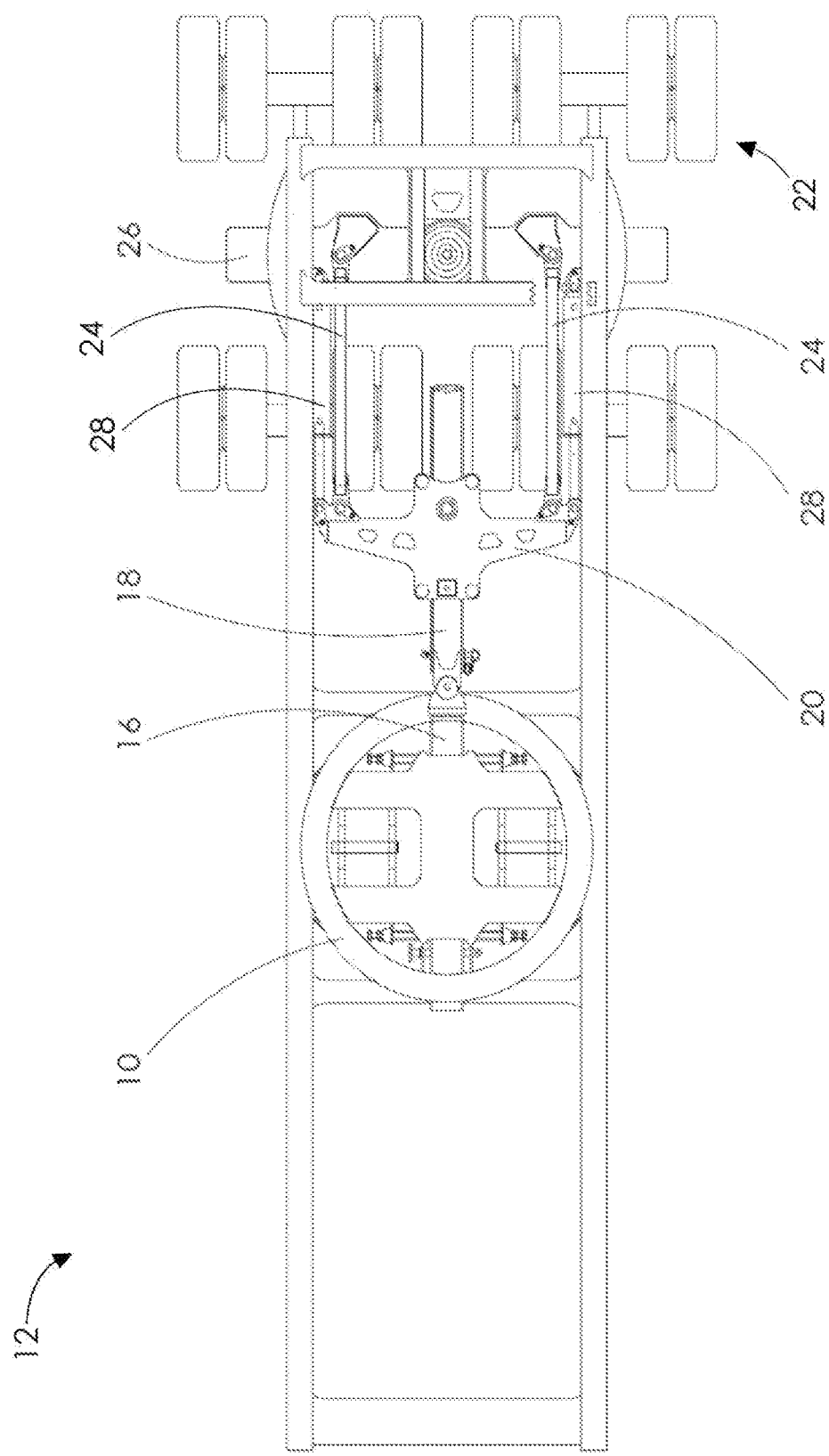
FIG. 2a is a top view of the dolly in FIG. 1 when set up in automatic steering mode whereby the turntable is connected to a pivot frame.

Referring to FIG. 2a, the dolly 12 comprises a main frame 11 which the turntable 10 is mounted on, a wheel group 22 pivotally mounted on the rear end the main frame 11, and a pivot frame 20 mounted on the main frame 11 between the turntable 10 and the wheel group 22. The pivot frame 20 is connected to the turntable 10 by a compensator bar 18 slidably mounted on the pivot frame 20 and an end of which is pivotally connected to a stinger bar 16 mounted on the turntable 10. Tie rods 24 are used to connect the pivot frame 20 to the wheel group 22.

Figure 2B:
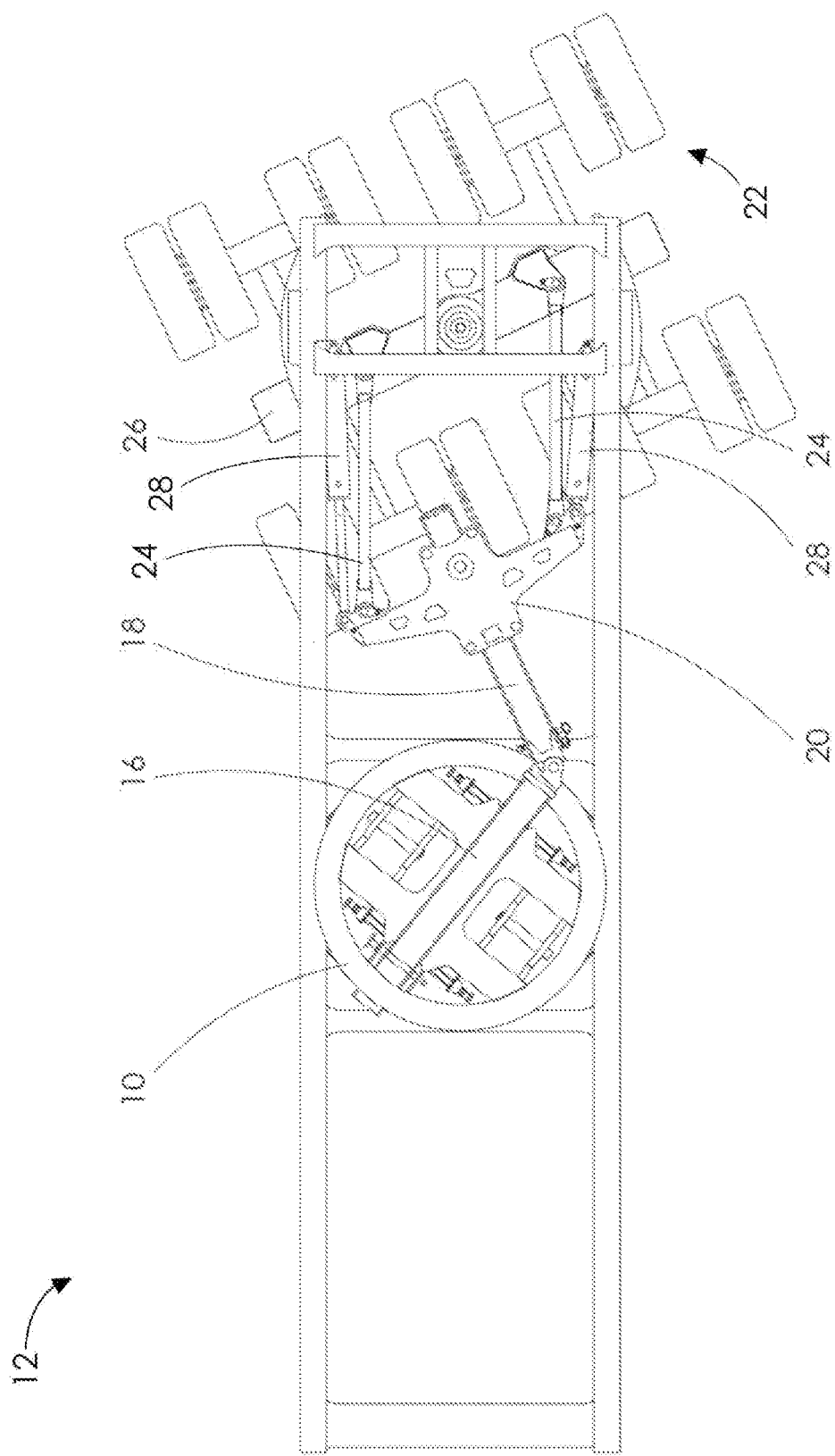
FIG. 2b is a top view of the dolly in FIG. 1 during a turn when set up in automatic steering mode.

Referring to FIG. 2b, the compensator bar 18 is hinged to the stinger bar 16 such that when the turntable 10 rotates in one direction, the pivot frame 20 is rotated in an opposite direction. Rotation of the pivot frame 20 automatically generates a corresponding motion of the tie rods 24 which causes the wheel group 22 to rotate in the same direction as the pivot frame 20. In automatic steering mode, the cylinders 28 connecting the pivot frame 20 and the main frame 11 may also be present but set to float such that they retract and extend freely as the turntable 10 causes the pivot frame 20 to rotate.

Figure 3A:
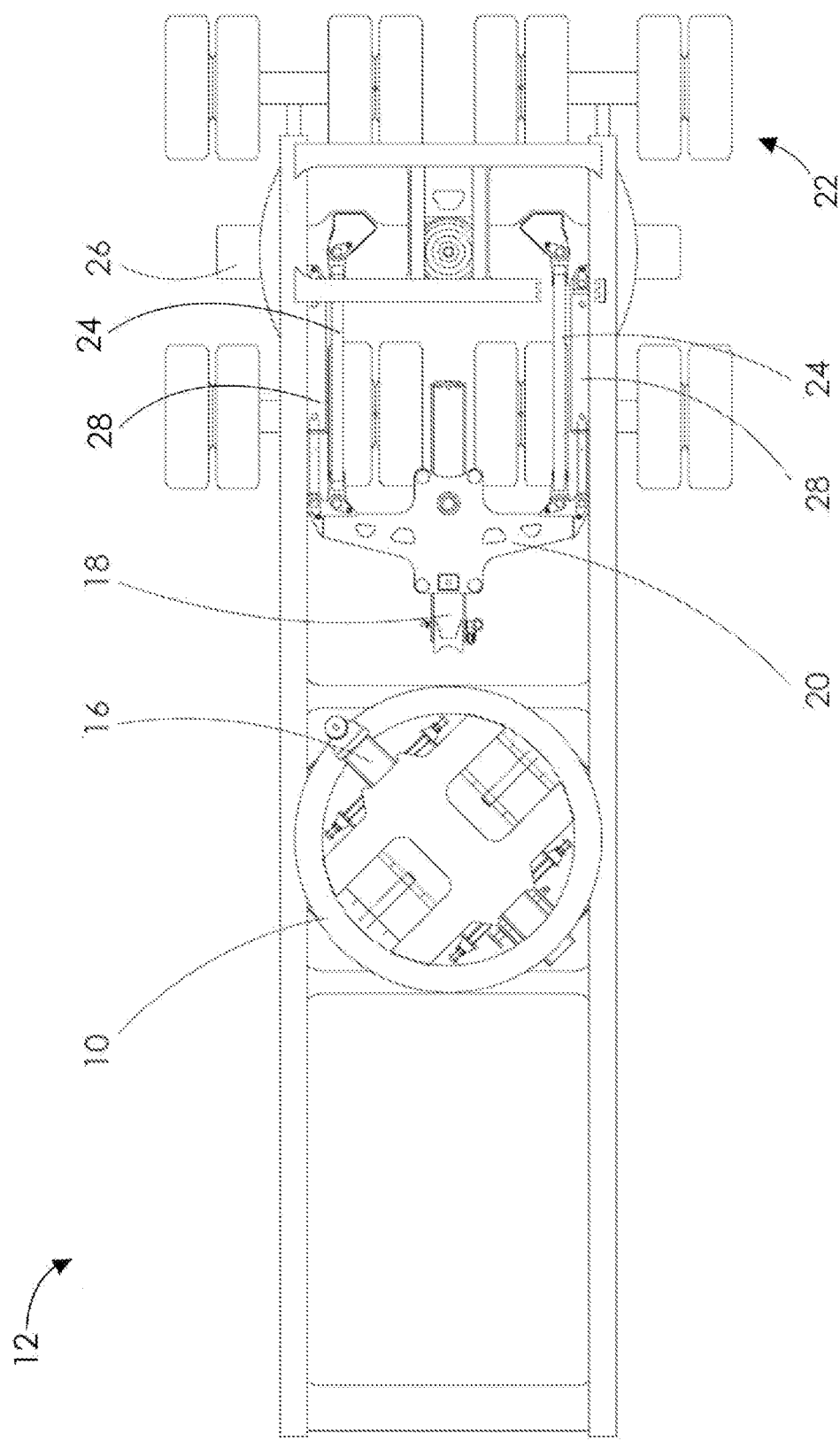
FIG. 3a is a top view of the doily in FIG. 1 when set up in direct steering mode whereby the pivot frame is disconnected from the turntable.
Figure 3B:
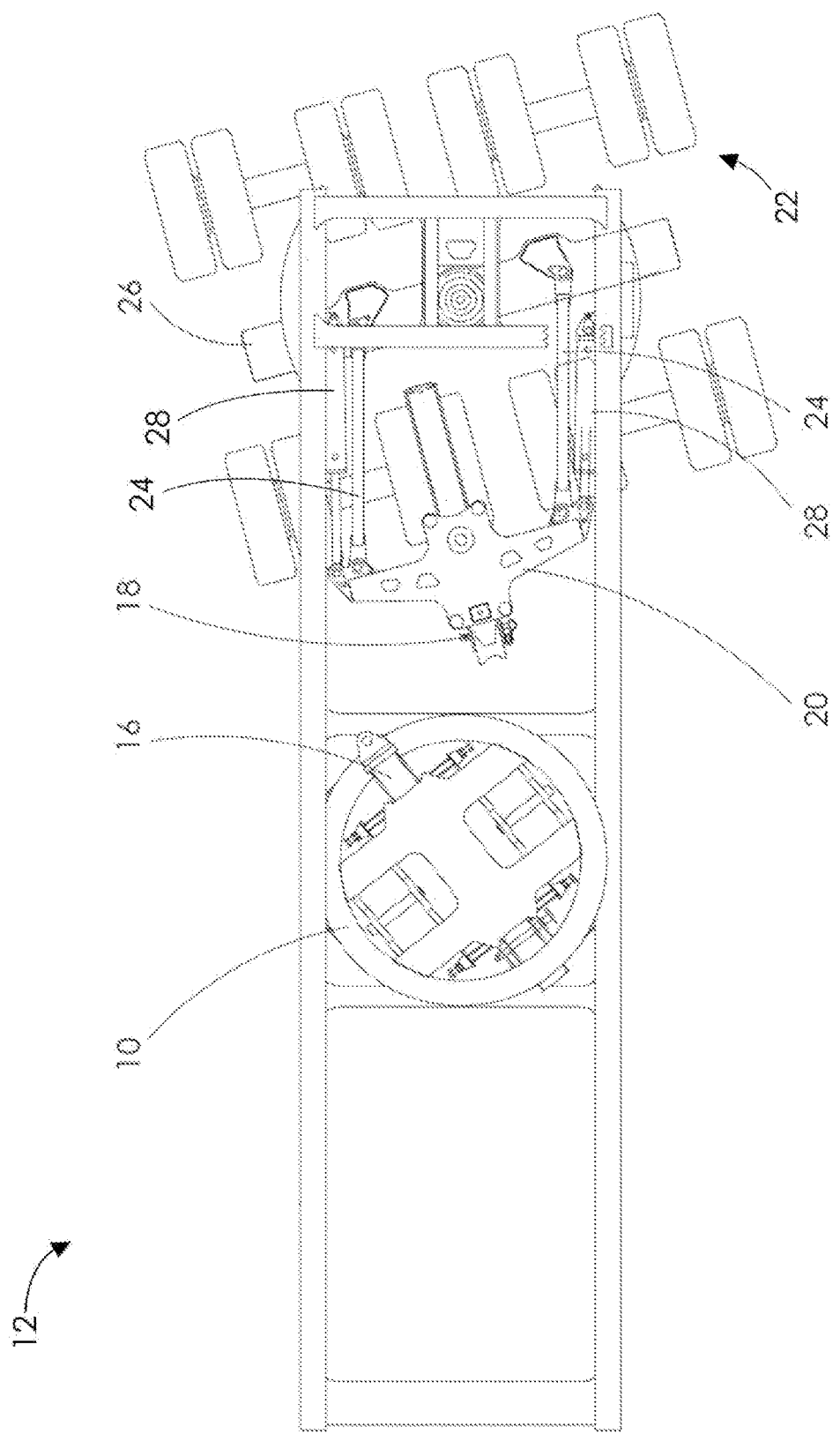
FIG. 3b is a top view of the dolly in FIG. 1 during a turn when set up in direct steering mode.

Referring to FIGS. 3a and 3b, the dolly 12 can be steered directly by disconnecting the compensator bar 18 from the stinger bar 16 thereby disconnecting the pivot frame 20 from the turntable 10. Referring to FIG. 3b, the cylinders 28 are directly controlled to extend and retract to rotate the pivot frame 20 which causes a corresponding movement of the tie rods 24 that rotates the wheel group 26.

The term "directly controlled", "directly controlling", "control directly", "directly steered", "steer directly" and "directly steering" are used herein to refer to being controlled or steered by an operator using, for example, a remote control as opposed to undergoing steering automatically as a result of the linkages on the unit.

Figure 4:
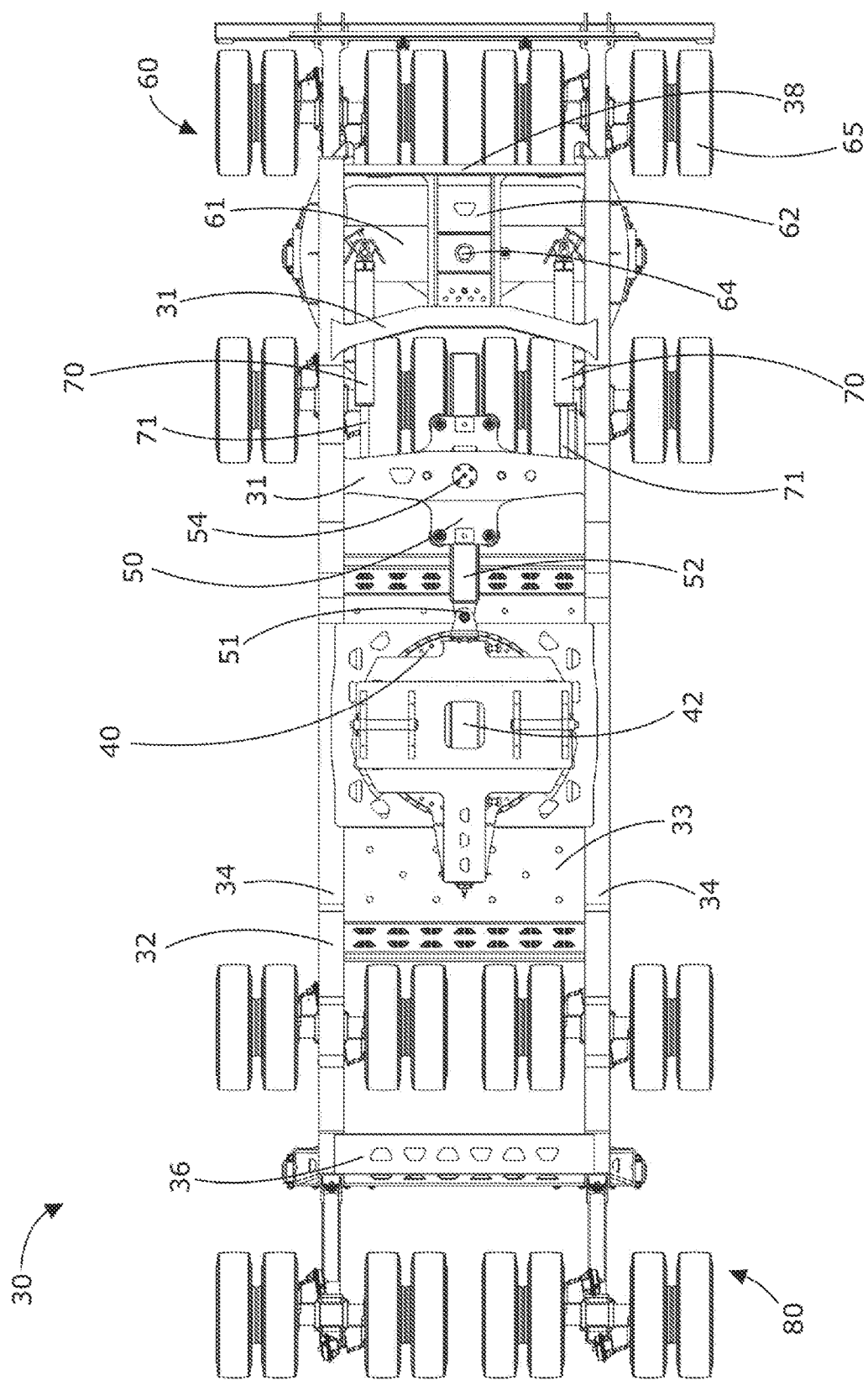
FIG. 4 is a top view of the preferred embodiment of the invention, with a turntable mounted on a steering dolly.
Figure 5:
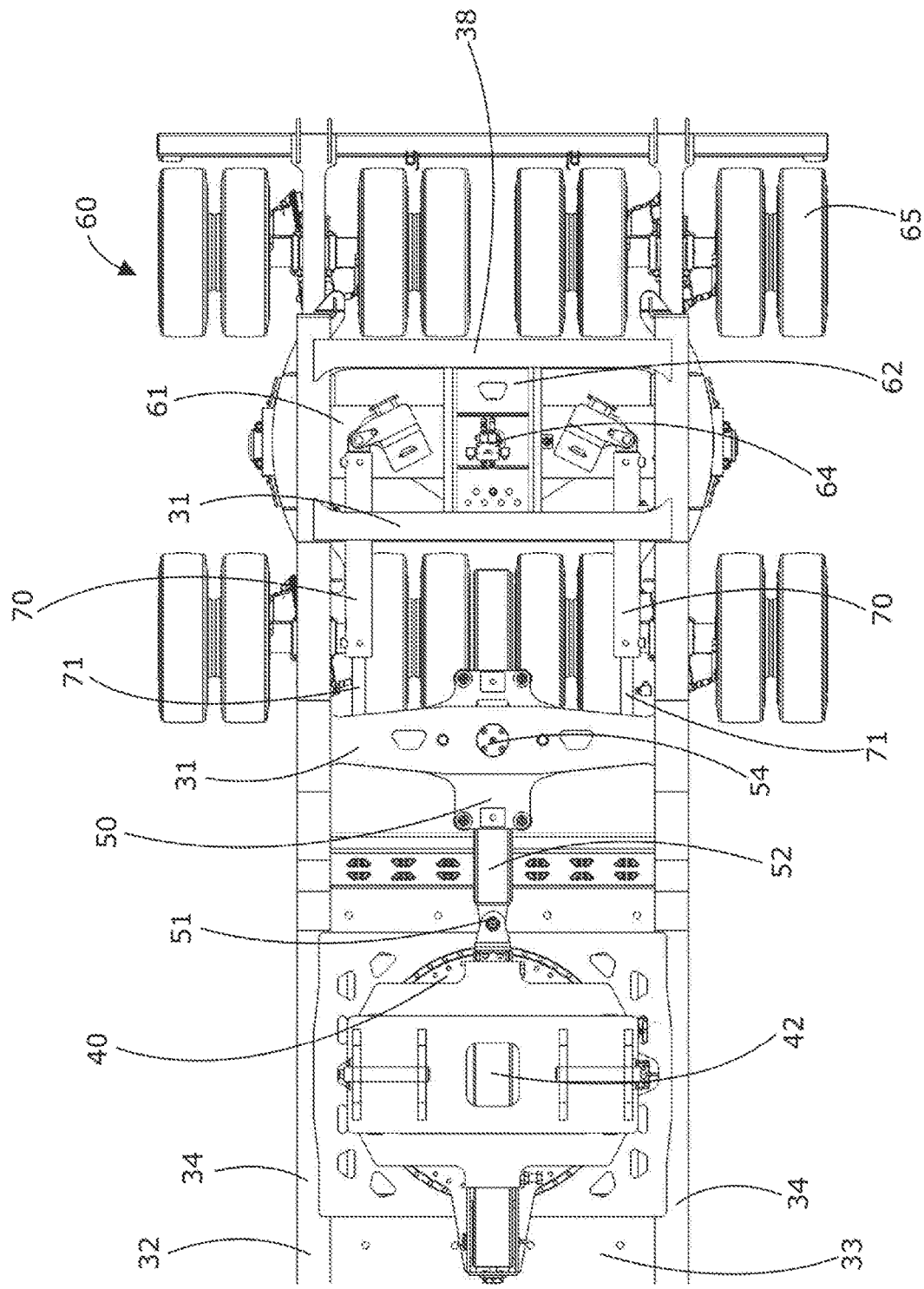
FIG. 5 is a magnified top view of the dolly in FIG. 4.

FIGS. 4 and 5 are top views of the preferred embodiment of the invention. No tie rods are used. Hydraulic cylinders 70 connect the pivot frame 50 directly to the wheel group 60 such that the cylinders 70 can act on the wheel group 60 directly.

The dolly 30 comprises a main frame 32, a rear wheel group 60 supporting the main frame 32 and pivotally connected to the main frame 32, and a pivot frame 50 pivotally connected on the main frame 32 between the turntable 40 and the rear wheel group 60.

The main frame 32 is preferably rectangular comprising a pair of substantially parallel side members 34 connected together by a front end member 36 and rear end member 38.

The main frame 32 may also comprise one or more cross members 31 extending between the side members 34. The pivot frame 50 may be centrally mounted on one of these cross members 31 to pivot about a pivot frame joint 54 on the cross member 31.

The main frame 32 may further comprise a platform 33 extending between the side members 34 for a length of the side members for the turntable 10 to be mounted on.

The wheel group 60 may be mounted on a longitudinal member 62 of the main frame 32 extending between the centre of the rear end member 38 and the centre of a cross member 31. The wheel group 60 is mounted centrally on the longitudinal member 62 to pivot about a wheel group pivot 64 on the longitudinal member 62. The wheel group 60 may comprise, as is known, a box frame 61 supporting a plurality of short track axles 63 and wheels 65 as illustrated. The dolly 30 may also have a front wheel group 80 located at the front end of the main frame 32.

Figure 10:
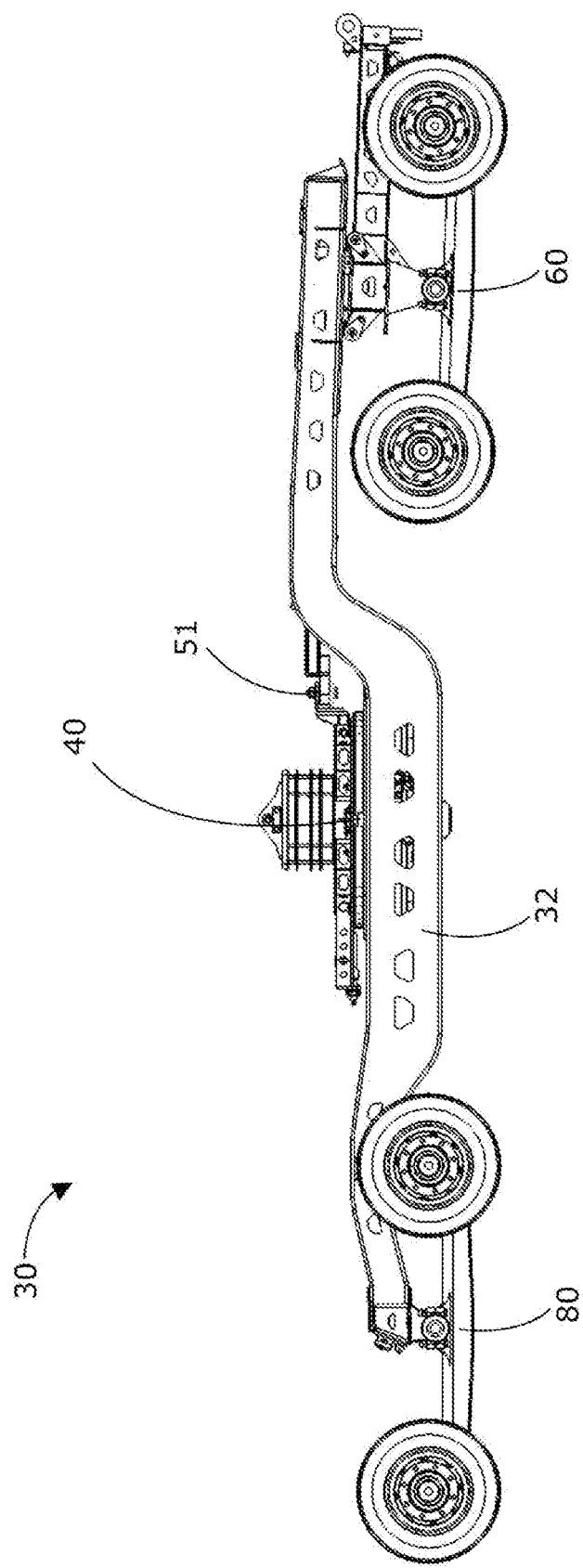
FIG. 10 is a side view of the dolly in FIG. 4.

Referring to FIG. 10, a turntable 40 is mounted on a steering dolly 30. The turntable 40 is used to pivotally connect the dolly 30 to another trailer unit (not shown). The other trailer unit may be a tractor, another dolly, a jeep, a booster or another type of heavy haul trailer unit.

Figure 6:
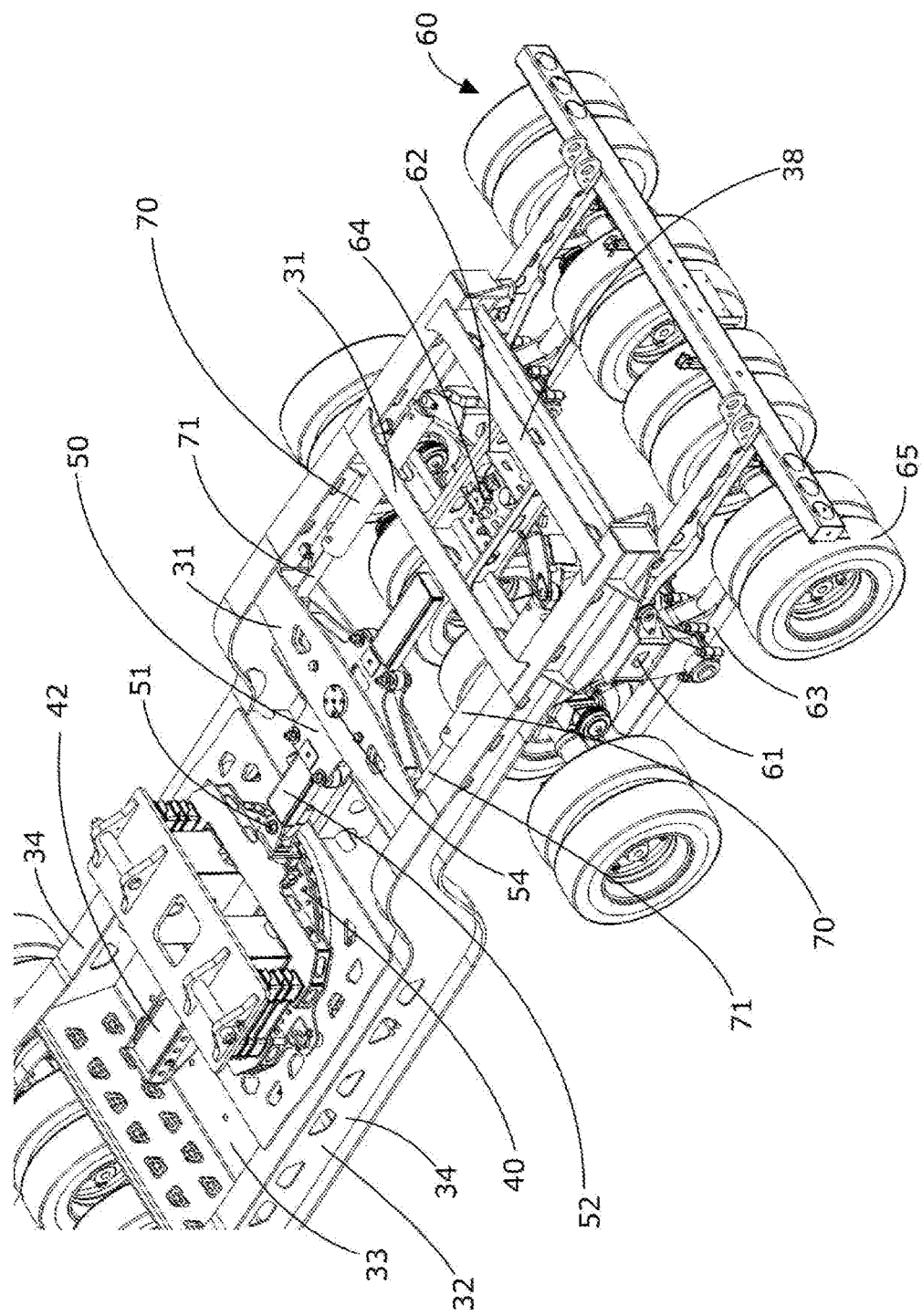
FIG. 6 is a rear perspective view of the dolly in FIG. 4.
Figure 7:
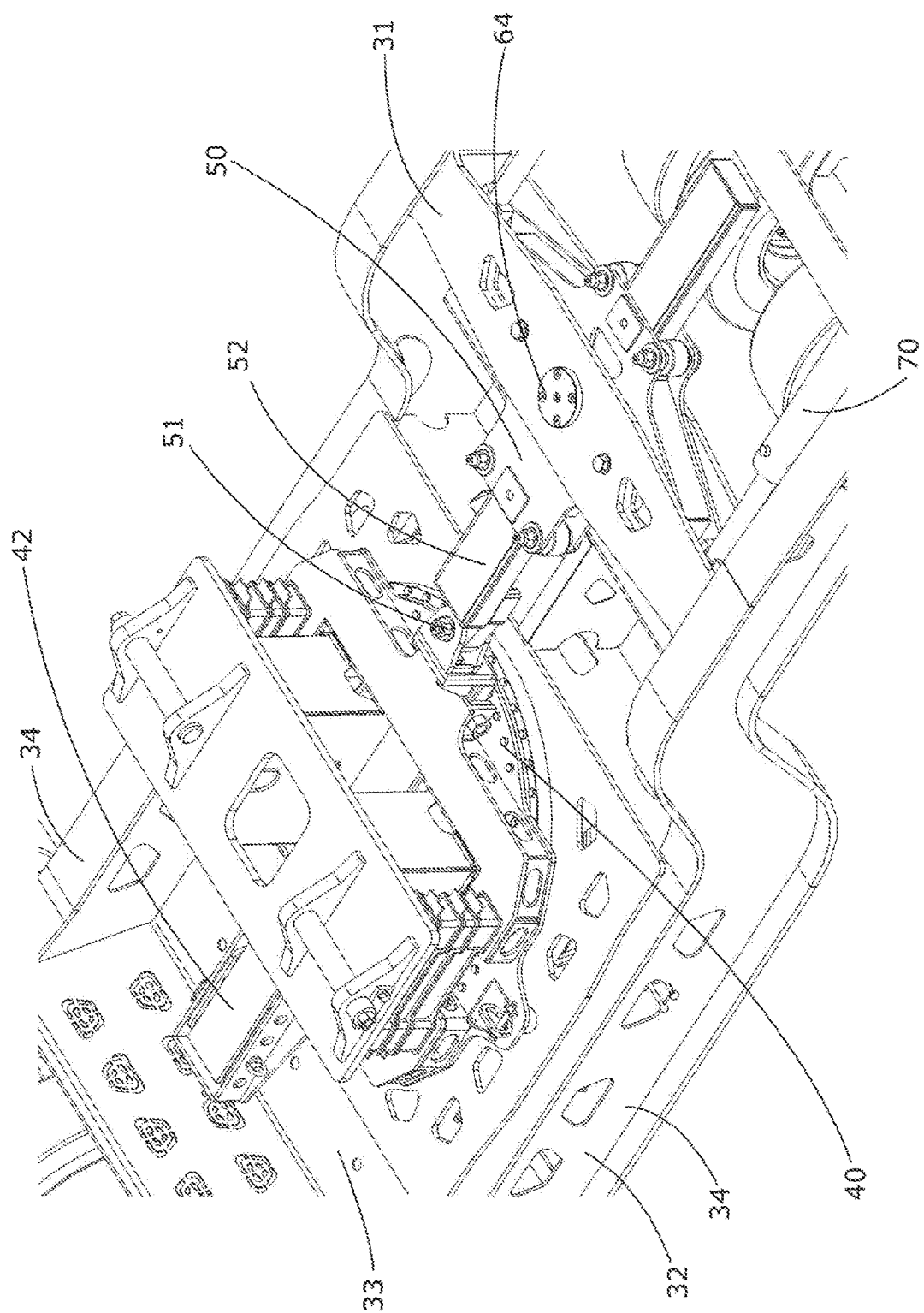
FIG. 7 is a magnified view of the turntable and the pivot frame of the dolly in FIG. 4.
Figure 8:
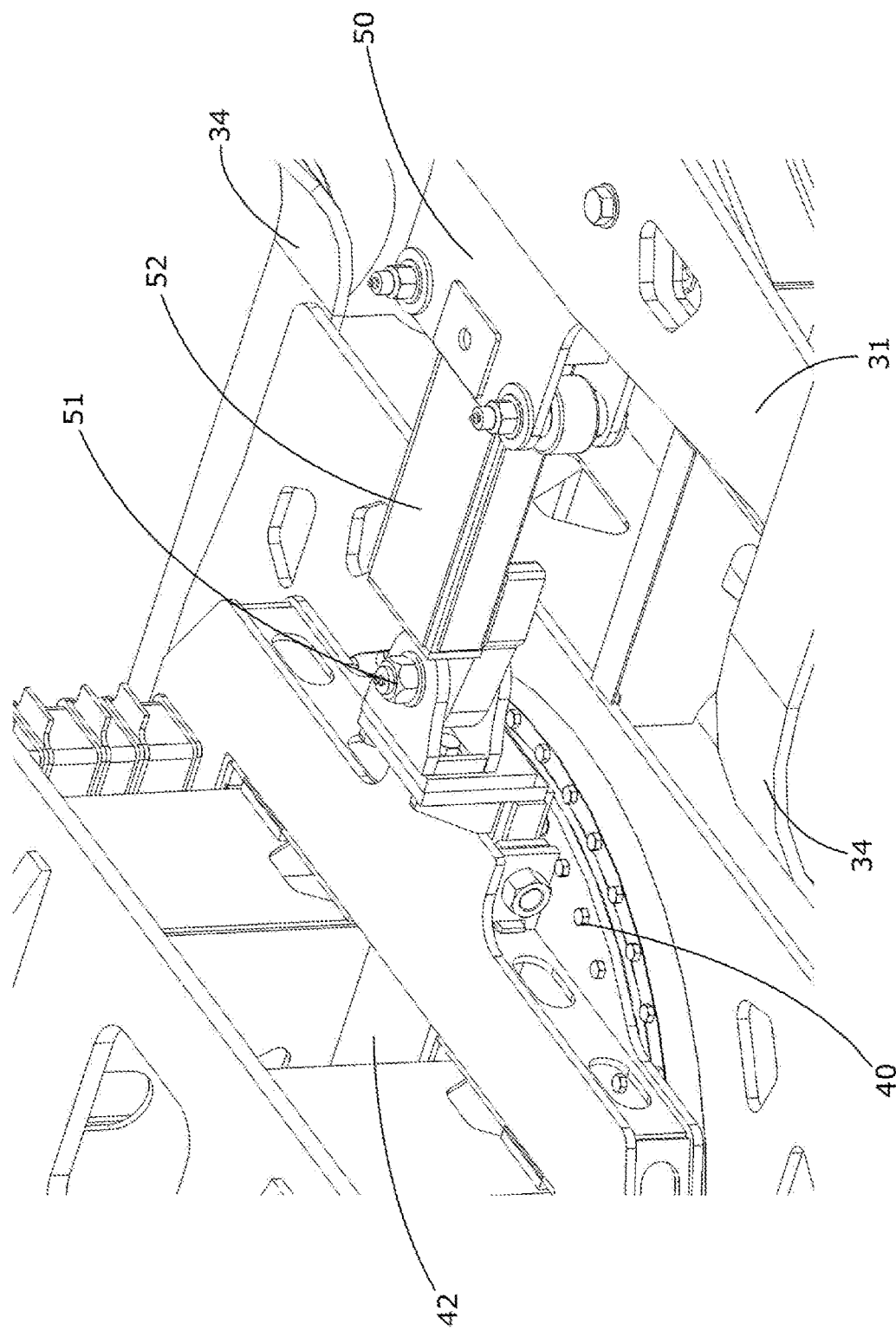
FIG. 8 is a magnified view of the linkage between the turntable and the pivot frame of the doily in FIG. 4.

Referring to FIGS. 6 and 7, the pivot frame 50 is connected to the turntable 40 by a counter-steering linkage 51. A magnified view of the counter-steering linkage 51 is shown in FIG. 8. In the illustrated embodiment, the counter-steering linkage 51 comprises a stinger bar 42 mounted on the turntable 40, the rear end of which is pivotally connected to the front end of a compensator bar 52 mounted on the pivot frame 50. Other counter-steering linkage may be contemplated.

The stinger bar 42 of the preferred embodiment is mounted centrally across the turntable 40 such that the rear end of the stinger bar 42 protrudes beyond the circumference of the turntable 40 to connect with the compensator bar 52. The stinger bar 42 may also be adjustable in length such that the length of which it protrudes beyond the circumference of the turntable 10 can be adjusted. During operation, the length of the stinger bar 42 is preferably fixed in place.

The compensator bar 52 is mounted centrally on the pivot frame 50. The front end of the compensator bar 52 is configured to pivotally connect with the rear end of the stinger bar 42 such that when the turntable 40 (and rear end of the stinger bar 42) rotates in one direction to actuate a turn, the rear end of the stinger bar 42 moves the front end of the compensator bar 52 towards the outside of the turn causing the pivot frame 50 to rotate in an opposite direction as the turntable 40. The compensator bar 52 is preferably adjustable in length and can extend and retract freely while being moved by the singer bar 42 (and turntable 40).

Figure 9:
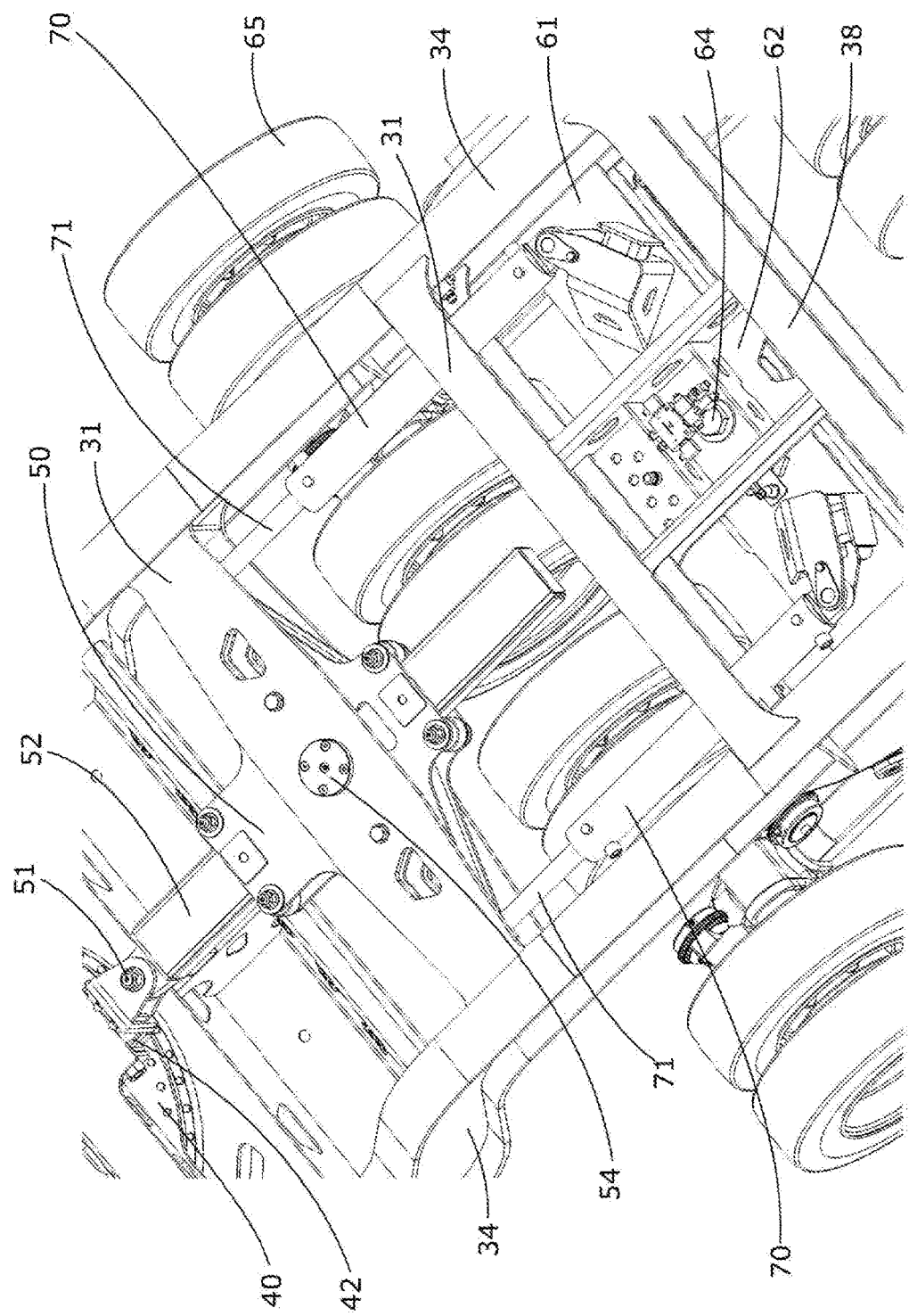
FIG. 9 is a magnified view of the pivot frame and the hydraulic cylinders of the dolly in FIG. 4.

Referring to FIG. 9, the pivot frame 50 is connected to the wheel group 60 by a pair of hydraulic cylinders 70, one on each side of the pivot frame 50. The front ends of the cylinders 70 are attached to opposing sides of the pivot frame 50, and the rear ends of the cylinders are attached to corresponding opposing sides of the wheel group 60.

Each cylinder 70 comprises a piston 71 that can be extended and retracted in length. Each cylinder 70 can be selectively lockable in a fixed length to act as a fixed length mechanical linkage between the pivot frame 50 and the wheel group 60. This configuration is used for automatically counter-steering the wheel group 60. In addition, each cylinder 70 can be selectively operable to controllably vary in extended length the piston 71 associated with the cylinder 70, thus operating in a variable length mode. This configuration is used to directly control the movement of the wheel group 60 such that pivoting of the wheel group 60 is controlled by extended lengths of the pistons 70. Referring again to FIG. 4, when the doily is not being steered or turned, the stinger bar 42 and compensator bar 52 are aligned with the longitudinal center line of the dolly 30.

The present invention further comprises a method of steering the dolly by operating the doily in an automatic steering mode. FIGS. 11-15 show the dolly 30 being operated in automatic counter-steering mode, actuated by rotation of the turntable 40. In automatic steering mode, the pistons 71 of the hydraulic cylinders 70 are locked to be fixed in extended length. Each cylinder 70 is selectively lockable in a fixed length and acts as a fixed length mechanical linkage between the pivot frame 50 and the wheel group 60.

Figure 11:
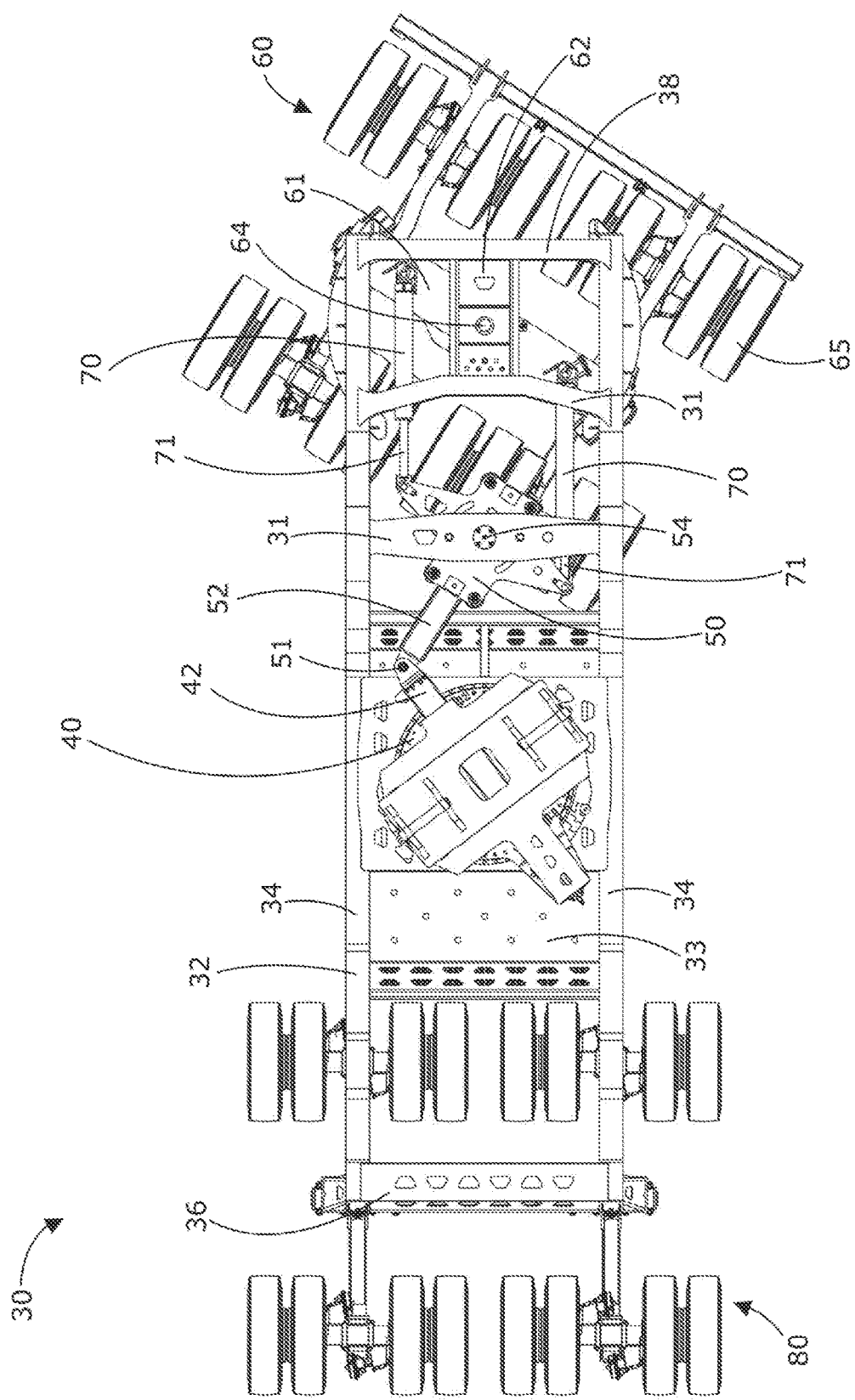
FIG. 11 is a top view of the doily in FIG. 4 during a turn, set up in automatic steering mode.
Figure 12:
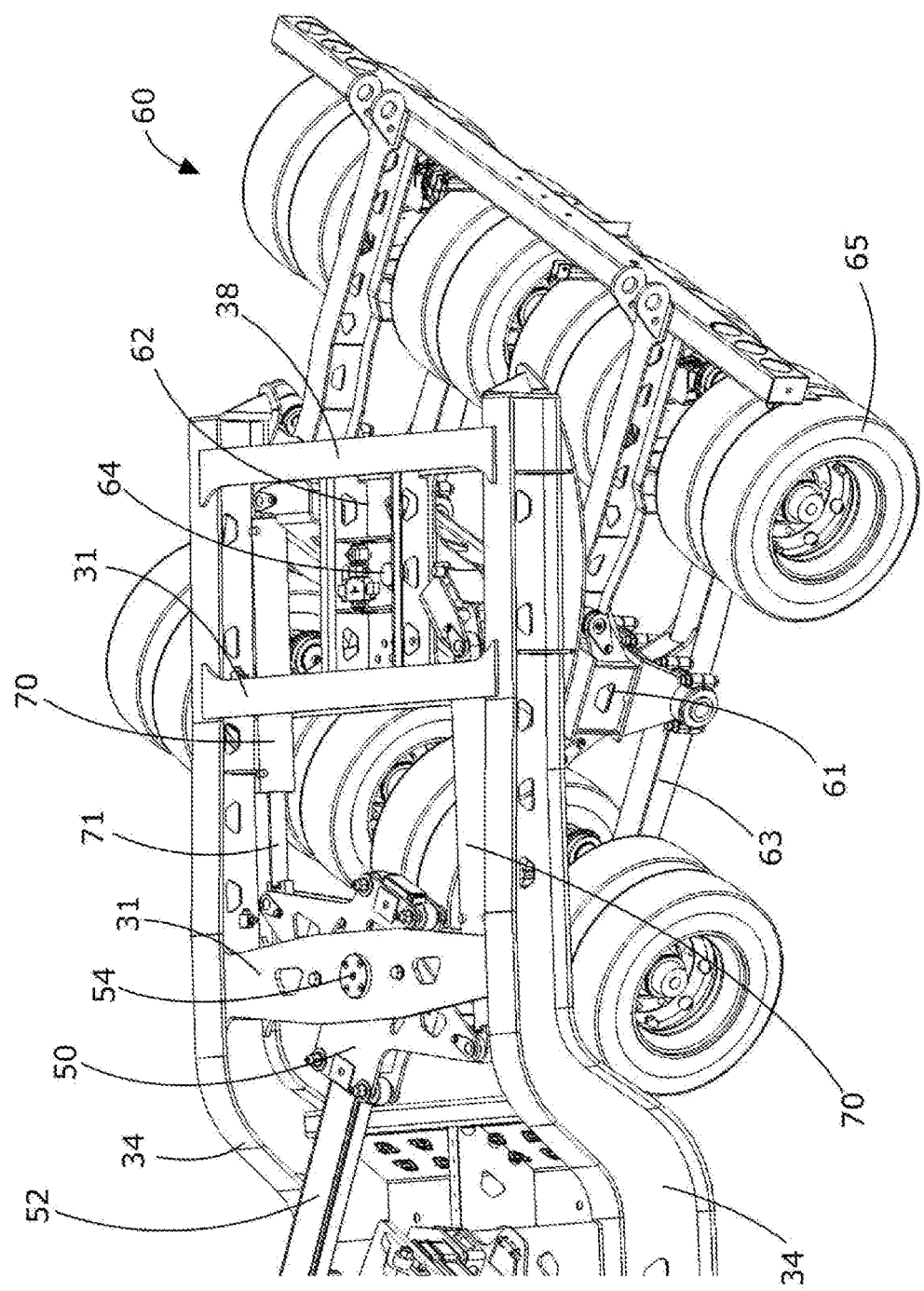
FIG. 12 is a rear perspective view of the dolly in FIG. 11.
Figure 13:
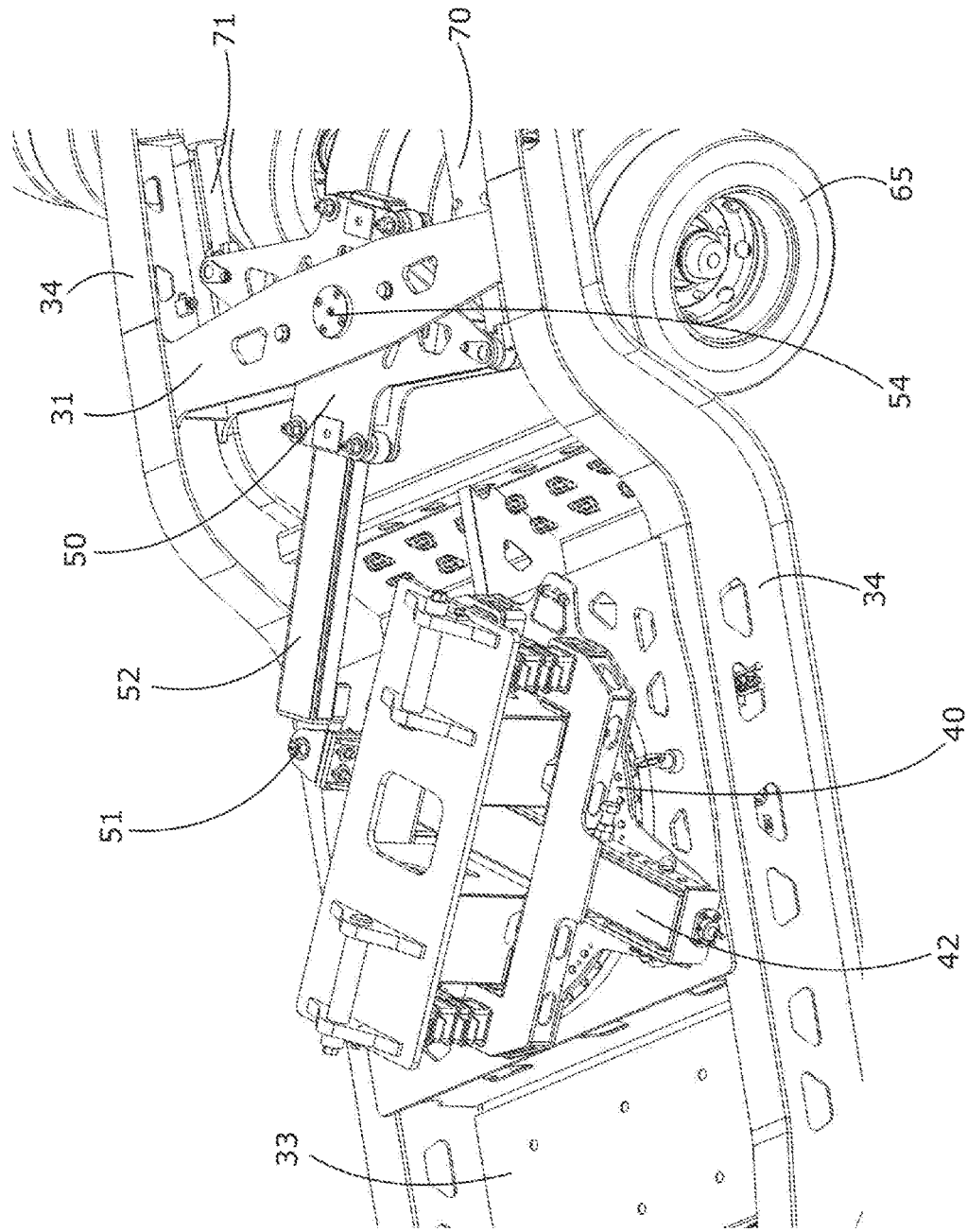
FIG. 13 is a magnified view of the turntable and the pivot frame of the dolly in FIG. 11.
Figure 14:
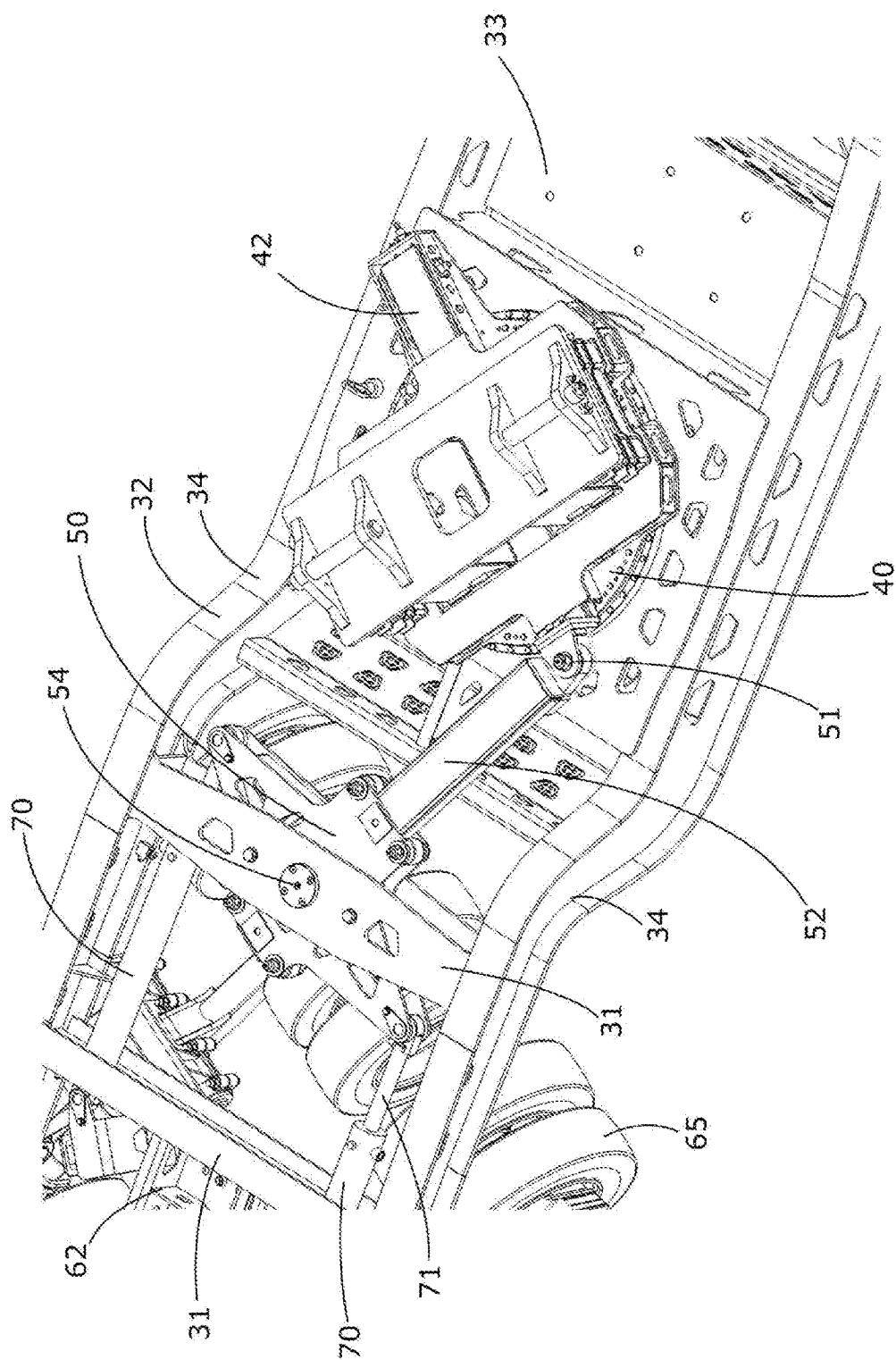
FIG. 14 is another magnified view of the turntable and the pivot frame of the doily in FIG. 11.
Figure 15:
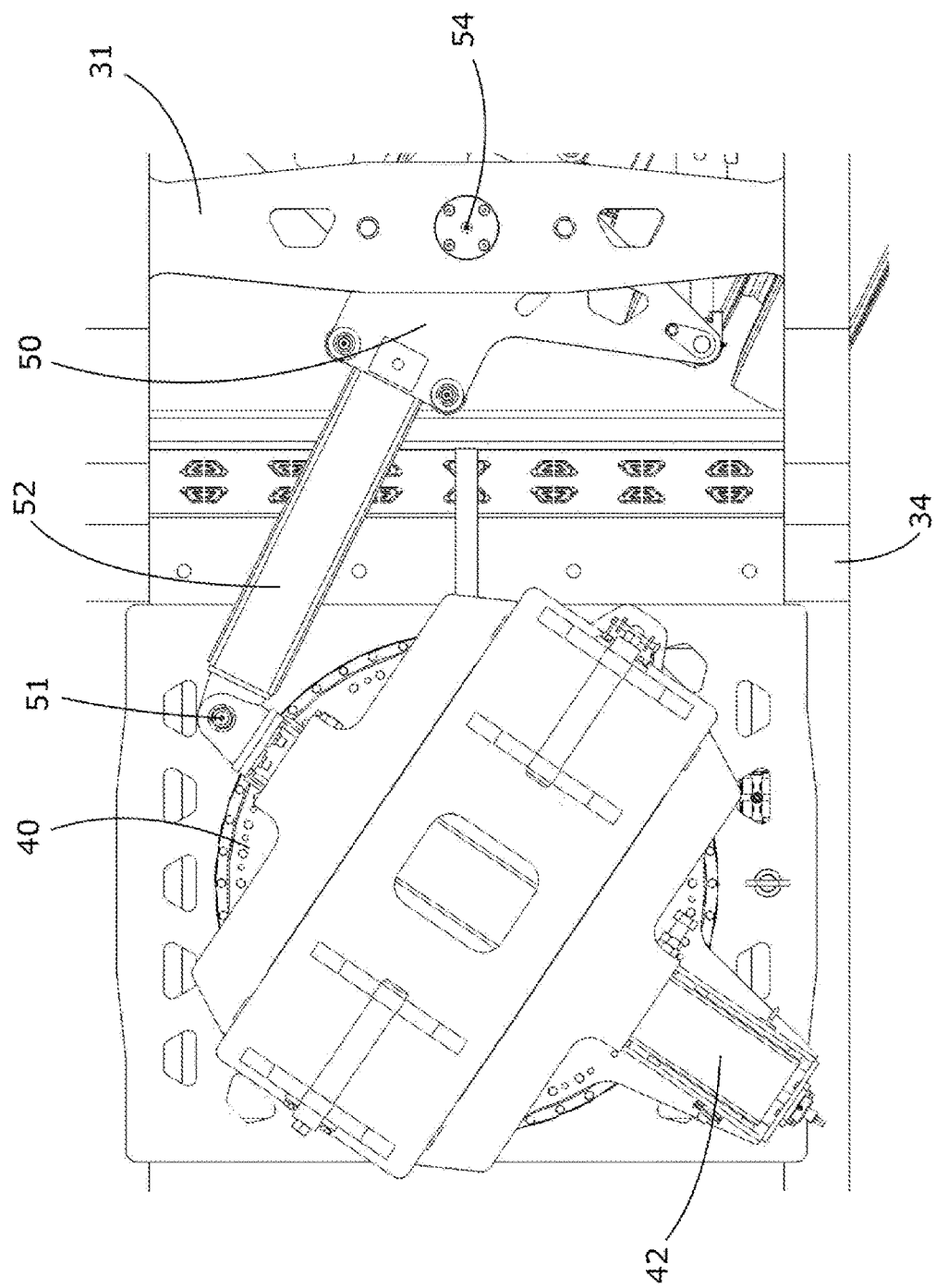
FIG. 15 is a magnified top view of the linkage between the turntable and the pivot frame of the dolly in FIG. 11.
Figure 16:
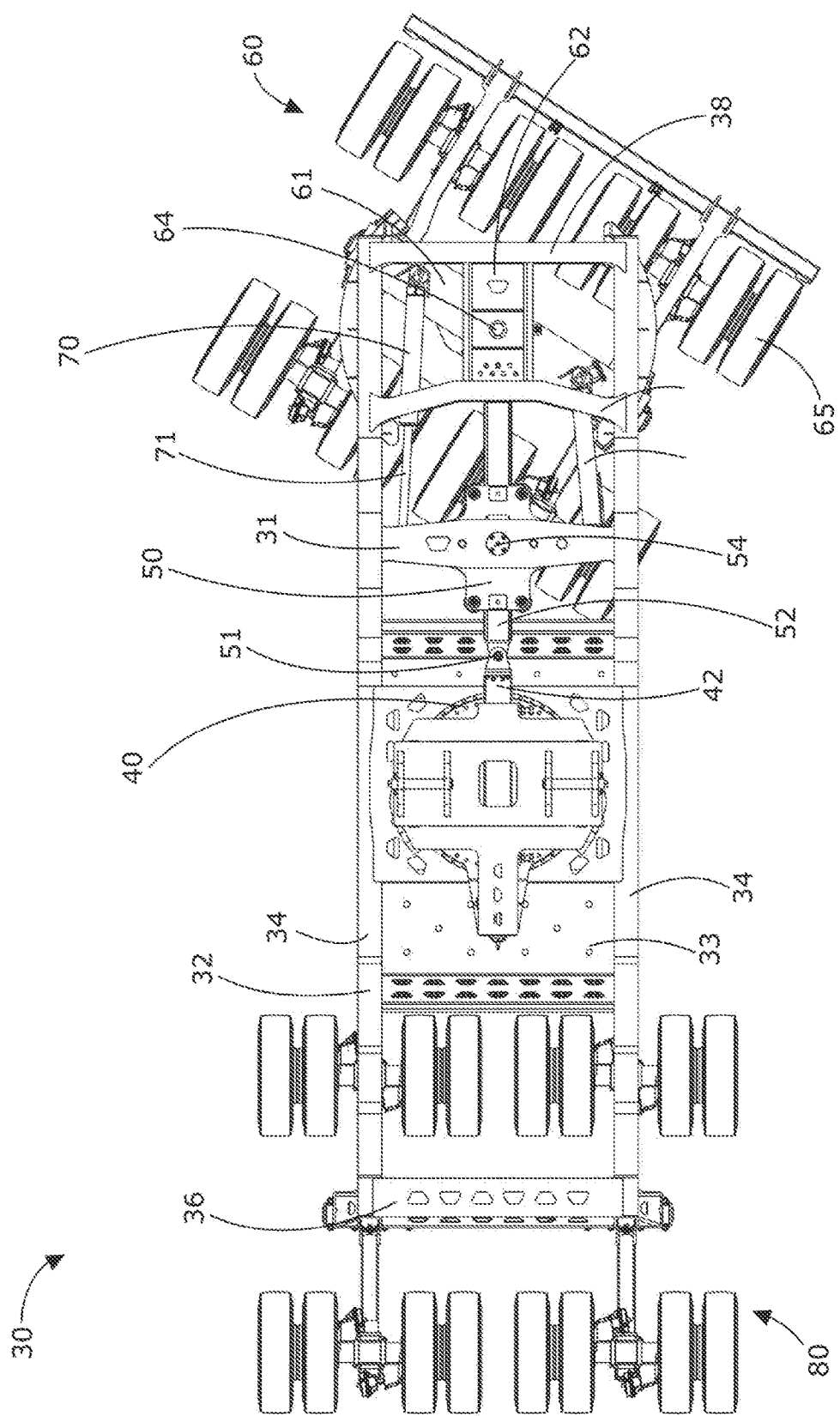
FIG. 16 is a top view of the dolly in FIG. 4 set up in direct steering mode.
Figure 17:
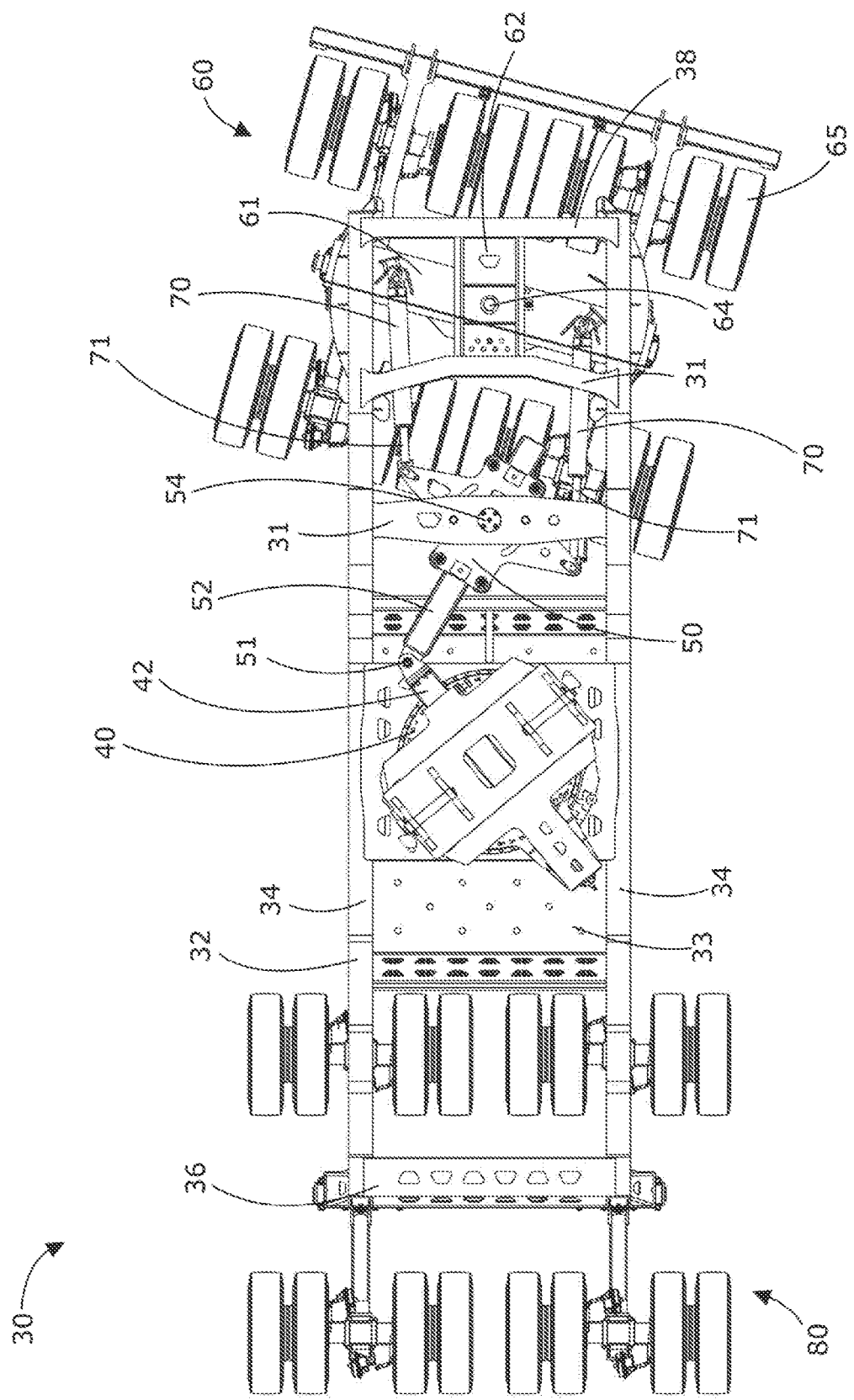
FIG. 17 is a top view of the dolly in FIG. 4 during a turn in direct steering mode where the wheel group is being steered directly back to straight.
Figure 18:
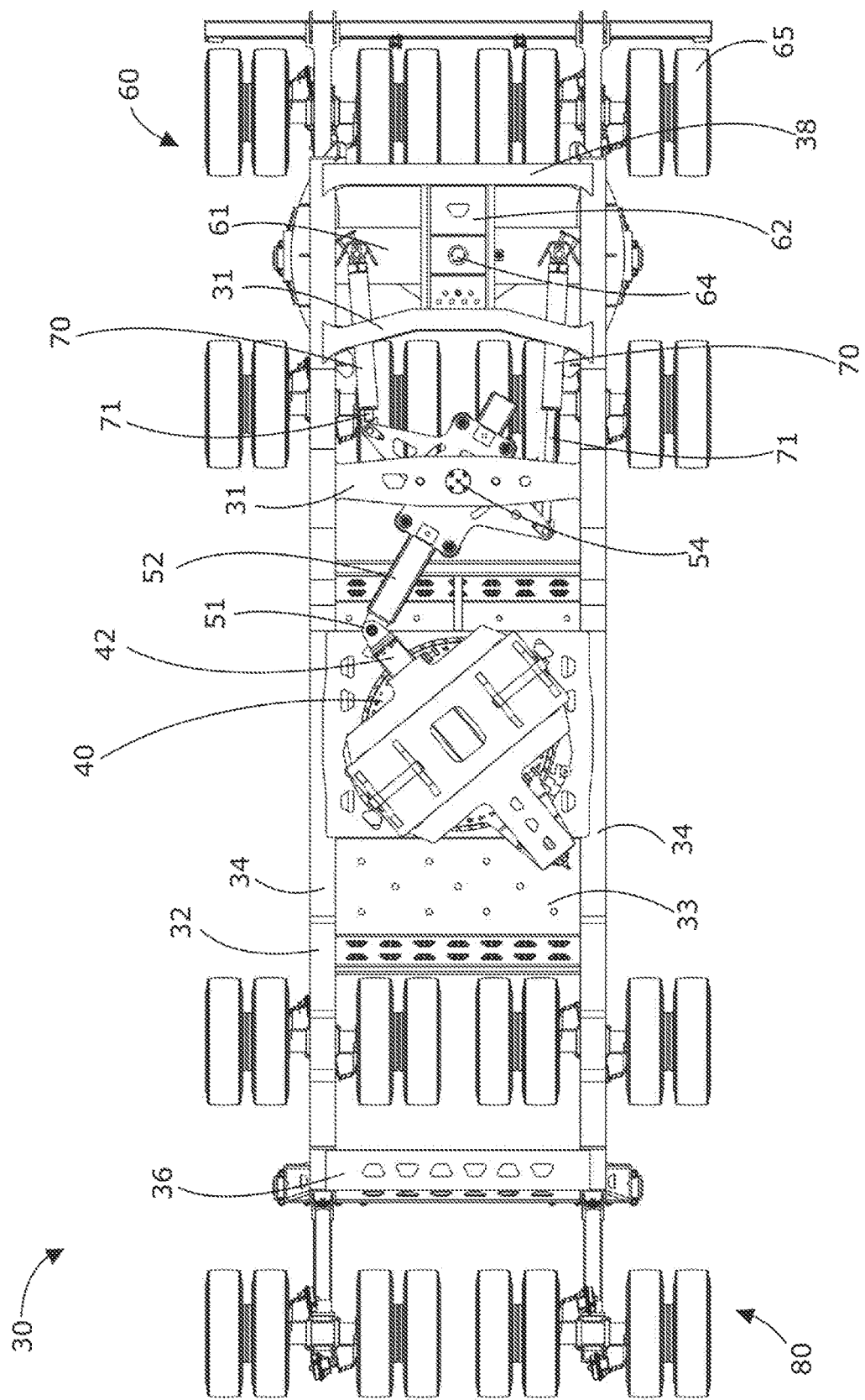
FIG. 18 is a top view of the dolly in FIG. 4 during a turn in direct steering mode where the wheel group has been steered directly back to straight.
Figure 19:
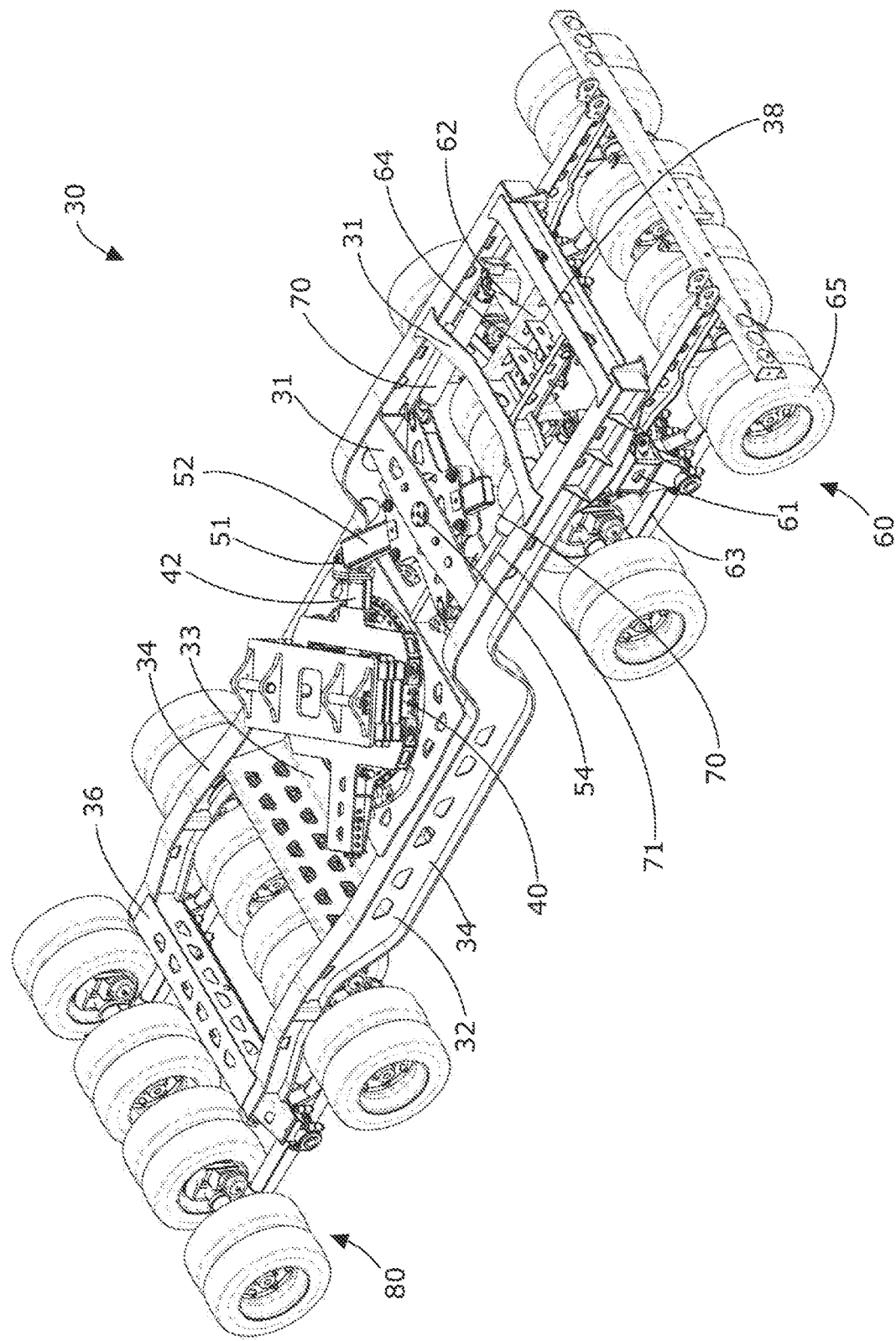
FIG. 19 is a rear perspective view of the doily in FIG. 18.
Figure 20:
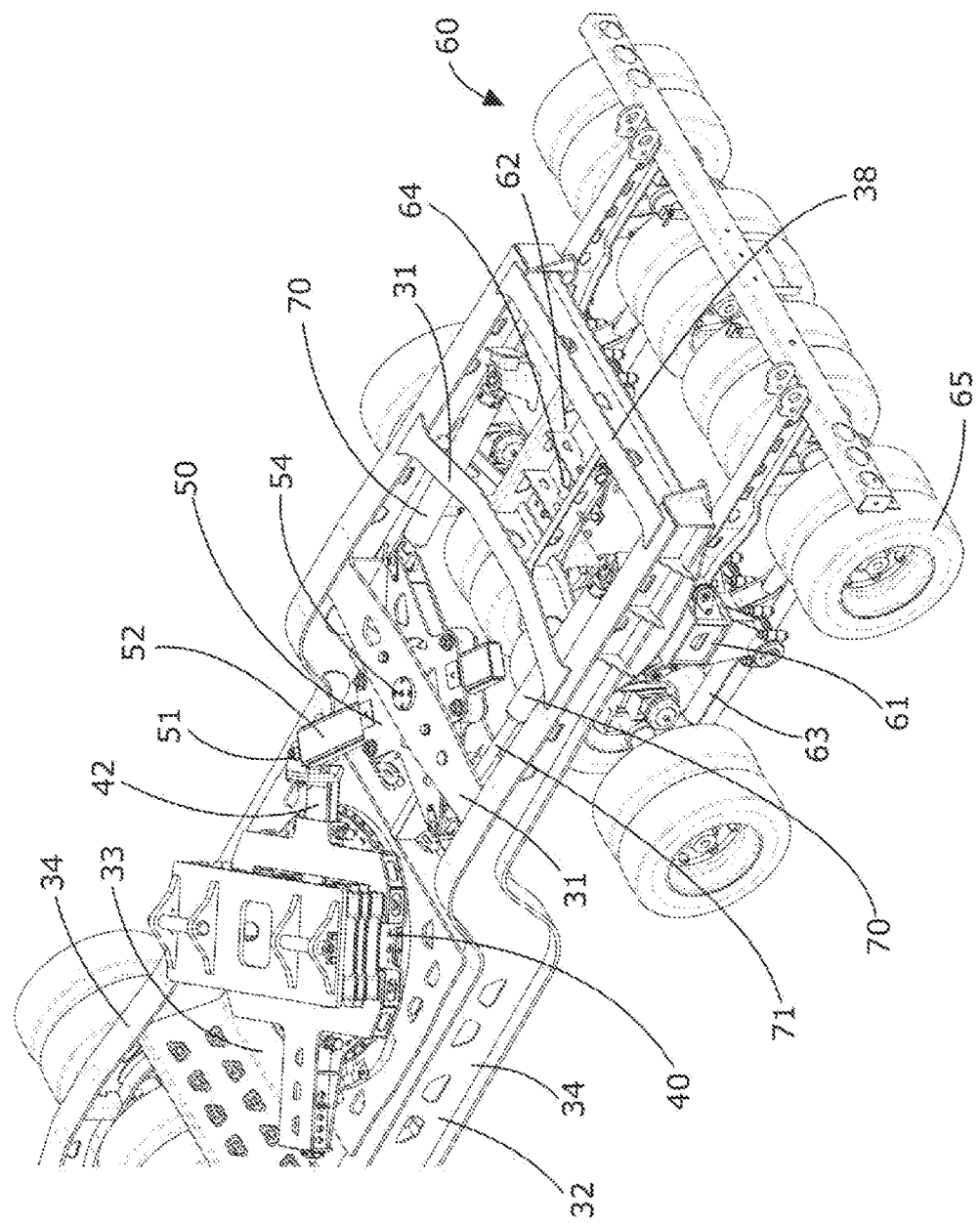
FIG. 20 is a magnified view of the dolly in FIG. 19.

Referring to FIG. 11, when the turntable 40 rotates counter-clockwise to actuate a turn, the rear end of the stinger bar 42 moves the front end of the compensator bar 52 towards the outside of the turn (shown in FIGS. 13-15). This causes the pivot frame 50 to rotate clockwise about the pivot frame joint 54, which generates a corresponding movement of the fixed length hydraulic cylinders 70 and causes the wheel group 60 to rotate clockwise as well about the wheel group pivot 64 (shown in FIG. 12).

In other words, when the turntable 40 rotates in one direction to actuate a turn, the rear end of the stinger bar 42 moves the front end of the compensator bar 62 towards the outside of the turn, which causes the pivot frame 50 to rotate in an opposite direction generating a corresponding movement of the fixed extension hydraulic cylinders 70, which causes the wheel group to rotate in the opposite direction thereby automatically counter-steering the wheel group 60 in relation to the direction of the turn.

The present invention further comprises a method for steering the dolly by operating the dolly in a direct steering mode. FIGS. 16-20 show the dolly 30 being steered directly by the hydraulic cylinders 70. In order to operate the dolly 30 in direct steering mode, the hydraulic cylinders 70 are released from the fixed extension mode and the respective extension lengths of their pistons 71 are directly controlled. Thus, the hydraulic cylinders 70 are operated in a variable length mode. Unlike the prior art, the pivot frame 50 remains connected to the turntable 40 (i.e. the compensator bar 52 stays connected to the stinger bar 42). Direct actuation of the piston 71 extensions (such as by remote control) causes the hydraulic assembly 70 to brace against the pivot frame 50 to which one end of each assembly is attached and to cause rotation of the wheel group 60 by the opposed ends of the hydraulic assemblies 70. In other words, the hydraulic cylinders 70 are operated to extend and retract, pushing against the pivot frame 50 and (indirectly) the turntable 40 to rotate the wheel group 60, thus directly steering the dolly 30.

The present invention further comprises a method of selectively operating the doily in the automatic steering mode or the direct steering mode.

It will be appreciated that the dolly according to the invention can be steered directly by operating the hydraulic cylinders without disconnecting the stinger bar and compensator bar.

While the preferred embodiment has been described using a turntable 40 for pivoting the dolly 30 in relation to another trailer unit (not shown), it will be appreciated that other pivot attachments may be used, such as a for example a fifth wheel.

The invention has been described in relation to a steering dolly. However, the principles of the invention may be applied to other steerable towed trailer units. In this description and in the claims, a "trailer unit" may be taken to be a tractor, a jeep, a dolly or a booster, with towed trailer units including a jeep, a dolly or a booster.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A heavy haul trailer dolly having a steering system, the dolly comprising:
   a main frame;
   a turntable mounted on the main frame;
   a wheel group pivotally connected to the main frame;
   a pivot frame pivotally connected to the main frame located between the turntable and the wheel group;
   a counter-steering linkage between the turntable and the pivot frame, comprising:
     a stinger bar mounted centrally across the turntable, and
     a compensator bar mounted centrally within the pivot frame and being extendable through the pivot frame, the compensator bar pivotally connected to an end of the stinger bar such that when the dolly is not being turned, the stinger bar and the compensator bar are aligned with a longitudinal center line of said dolly; and
   a pair of hydraulic cylinders connecting the pivot frame and the wheel group, a first of said hydraulic cylinders having a first end connected to a first side of said pivot frame and having a second end connected to said wheel group on a first side of said wheel group, a second of said hydraulic cylinders having a first end connected to a second side of said pivot frame, said second side of said pivot frame being opposite said first side of said pivot frame, and a having a second end connected to said wheel group on a second side of said wheel group, said second side of said wheel group being opposite too said first side of said wheel group;
   each cylinder being lockable in a fixed length so as to act as a fixed length mechanical linkage between the pivot frame and the wheel group for automatically counter-steering the wheel group, and each cylinder being operable to vary in length a piston associated with the cylinder for directly controlling the steering of the wheel group.

2. A method of steering a heavy haul trailer dolly comprising:
   providing a heavy haul trailer dolly comprising a main frame, a turntable mounted on the main frame, a wheel group pivotally connected the main frame, a pivot frame pivotally connected to the main frame located between the turntable and the wheel group, a stinger bar mounted centrally across said turntable and an end of said stinger bar pivotally connected to a compensator bar mounted centrally within the pivot frame and being extendable through the pivot frame, and configured such that when said dolly is not being turned, the stinger bar and the compensator bar are aligned with a longitudinal center line of said dolly, and a pair of hydraulic cylinders each of said cylinders being connected to the pivot frame and to the wheel group;
   and;

operating the dolly in an automatic steering mode by causing the hydraulic cylinders to be locked at a fixed length.

3. A method of steering a heavy haul trailer dolly, comprising:
providing a heavy haul trailer dolly comprising a main frame, a turntable mounted on the main frame, a wheel group pivotally connected the main frame, a pivot frame pivotally connected to the main frame located between the turntable and the wheel group, a stinger bar mounted on the turntable and pivotally connected to a compensator bar mounted on the pivot frame, and a pair of hydraulic cylinders connecting the pivot frame and the wheel group;
operating the dolly in an automatic steering mode by causing the hydraulic cylinders to be locked at a fixed length; and
rotating the turntable in one direction to actuate a turn such that a rear end of the stinger bar moves a front end of the compensator bar towards the outside of the turn thereby causing the pivot frame to rotate in an opposite direction whereby to cause the hydraulic cylinders to rotate the wheel group in said opposite direction.

4. A method of steering a heavy haul trailer dolly, the method comprising:
providing a haul trailer dolly comprising a main frame, a turntable mounted on the main frame, a wheel group pivotally connected to the main frame, a pivot frame pivotally connected to the main frame located between the turntable and the wheel group, a stinger bar mounted centrally across the turntable and an end of said stinger bar pivotally connected to a compensator bar mounted centrally within the pivot frame and such that when said dolly is not being turned, the stinger bar and the compensator bar are aligned with a longitudinal center line of said dolly, and a pair of hydraulic cylinders connecting the pivot frame and the wheel group, a first of said hydraulic cylinders having a first end connected to a first side of said pivot frame and having a second end connected to said wheel group on a first side of said wheel group, a second of said hydraulic cylinders having a first end connected to a second side of said pivot frame, said second side of said pivot frame being opposite said first side of said pivot frame, and a having a second end connected to said wheel group on a second side of said wheel group, said second side of said wheel group being opposite too said first side of said wheel group;
the method comprising:
operating the dolly in a direct steering mode by operating the cylinders in variable length mode to act on the wheel group to rotate according to extension lengths of pistons associated with said cylinders.

5. A method of steering a heavy haul trailer dolly,
dolly comprising a main frame, a turntable mounted on the main frame, a wheel group pivotally connected to the main frame, a pivot frame pivotally connected to the main frame located between the turntable and the wheel group, a stinger bar mounted centrally across the turntable and an end of said stinger bar pivotally connected to a compensator bar mounted centrally on the pivot frame such that when said dolly is not being turned, the stinger bar and the compensator bar are aligned with a longitudinal center line of said dolly, and a pair of hydraulic cylinders connecting the pivot frame and the wheel group, a first of said hydraulic cylinders having a first end connected to a first side of said pivot frame and having a second end connected to said wheel group on a first side of said wheel group, a second of said hydraulic cylinders having a first end connected to a second side of said pivot frame, said second side of said pivot frame being opposite said first side of said pivot frame, and a having a second end connected to said wheel group on a second side of said wheel group, said second side of said wheel group being opposite too said first side of said wheel group;
the method comprising:
selectively operating the dolly in an automatic steering mode or a direct steering mode,
the automatic steering mode comprising locking each of the hydraulic cylinders at a fixed length; and
the direct steering mode comprising unlocking the hydraulic cylinders from being in a fixed length and operating the cylinders in variable length mode by varying in extension length pistons associated with said cylinders.

6. A heavy haul trailer unit having a steering system, the trailer unit comprising:
a main frame;
a pivot attachment for pivotally connecting the trailer unit to another trailer unit;
a wheel group pivotally connected to the main frame;
a pivot frame pivotally connected to the main frame;
a counter-steering linkage between the pivot attachment and the pivot frame comprising a stinger bar mounted centrally across a turntable and a compensator bar alignable with a center line of the dolly; and
a pair of hydraulic cylinders connecting the pivot frame and the wheel group, a first of said hydraulic cylinders having a first end connected to a first side of said pivot frame and having a second end connected to said wheel group on a first side of said wheel group, a second of said hydraulic cylinders having a first end connected to a second side of said pivot frame, said second side of said pivot frame being opposite said first side of said pivot frame, and a having a second end connected to said wheel group on a second side of said wheel group, said second side of said wheel group being opposite to said first side of said wheel group;
each cylinder being selectively lockable in a fixed length so as to act as a fixed length mechanical linkage between the pivot frame and the wheel group for automatically counter-steering the wheel group, and being selectively operable to controllably vary in extended length a piston associated with the cylinder whereby pivoting of the wheel group may be controlled by extended lengths of pairs of pistons respectively associated with the cylinders.

7. The heavy haul trailer unit of claim 6 wherein the compensator bar is mounted centrally on the pivot frame, the compensator bar pivotally connected to an end of the stinger bar.

8. The heavy haul trailer unit of claim 6 wherein the heavy haul trailer unit is a dolly.

9. The heavy haul trailer unit of claim 6 wherein the pivot attachment is a turntable.

* * * * *

UNITED STATES PATENT AND TRADEMARK OFFICE
CERTIFICATE OF CORRECTION

PATENT NO. : 11,952,036 B2
APPLICATION NO. : 17/373300
DATED : April 9, 2024
INVENTOR(S) : Patrick Scheller and Phil Johnston It is certified that error appears in the above-identified patent and that said Letters Patent is hereby corrected as shown below:

In the Specification

| | |
|---|---|
| Background of the Invention | Column 1, Line 24, delete "doily" and insert --dolly-- |
| Background of the Invention | Column 1, Line 27, delete "doily" and insert --dolly-- |
| Summary of the Invention | Column 2, Line 37, delete "doily" and insert --dolly-- |
| Summary of the Invention | Column 2, Line 66, fourth word, delete "doily" and insert --dolly-- |
| Summary of the Invention | Column 2, Line 26, sixth word, delete "doily" and insert --dolly-- |
| Summary of the invention | Column 3, Line 26, delete "doily" and insert --dolly-- |
| Brief Description of the Drawings | Column 4, Line 43, delete "doily" and insert --dolly-- |
| Brief Description of the Drawings | Column 4, Line 55, delete "doily" and insert --dolly-- |
| Brief Description of the Drawings | Column 4, Line 59, delete "doily" and insert --dolly-- |
| Brief Description of the Drawings | Column 4, Line 65, delete "doily" and insert --dolly-- |
| Brief Description of the Drawings | Column 5, Line 9, delete "doily" and insert --dolly-- |
| Detailed Description of at Least One Mode for Carrying out the Invention in Terms of Example(s) | Column 7, Line 3, delete "doily" and insert --dolly-- |

Signed and Sealed this
Twenty-first Day of May, 2024

*Katherine Kelly Vidal*

Katherine Kelly Vidal
*Director of the United States Patent and Trademark Office*

CERTIFICATE OF CORRECTION (continued)
U.S. Pat. No. 11,952,036 B2

| | |
|---|---|
| Detailed Description of at Least One Mode for Carrying out the Invention in Terms of Example(s) | Column 7, Line 7, delete "doily" and insert --dolly-- |
| Detailed Description of at Least One Mode for Carrying out the Invention in Terms of Example(s) | Column 7, Line 55, delete "doily" and insert --dolly-- |